United States Patent
Nakthewan et al.

(10) Patent No.: US 11,373,456 B2
(45) Date of Patent: Jun. 28, 2022

(54) SYSTEM AND METHOD FOR DESIGNING A CUSTOMIZED VEHICLE REPAIR CONFIGURATION

(71) Applicant: RED TUNA LIMITED, Hong Kong (CN)

(72) Inventors: Kritsada Nakthewan, Chonburi (TH); Pierre Nicolau, Chonburi (TH)

(73) Assignee: RED TUNA LIMITED, Hong Kong (CN)

( * ) Notice: Subject to any disclaimer, the term of this patent is extended or adjusted under 35 U.S.C. 154(b) by 215 days.

(21) Appl. No.: 16/623,481

(22) PCT Filed: Jun. 25, 2018

(86) PCT No.: PCT/IB2018/054682
§ 371 (c)(1),
(2) Date: Dec. 17, 2019

(87) PCT Pub. No.: WO2019/003093
PCT Pub. Date: Jan. 3, 2019

(65) Prior Publication Data
US 2020/0193726 A1 Jun. 18, 2020

Related U.S. Application Data

(60) Provisional application No. 62/525,074, filed on Jun. 26, 2017.

(51) Int. Cl.
*G07C 5/00* (2006.01)
*B62D 65/02* (2006.01)
*G07C 5/08* (2006.01)

(52) U.S. Cl.
CPC ........... *G07C 5/006* (2013.01); *B62D 65/026* (2013.01); *B62D 65/028* (2013.01); *G07C 5/008* (2013.01); *G07C 5/0808* (2013.01)

(58) Field of Classification Search
CPC ...... G07C 5/006; G07C 5/008; G07C 5/0808; B62D 65/026; B62D 65/028; B21D 1/12; G06Q 10/20
See application file for complete search history.

(56) References Cited

U.S. PATENT DOCUMENTS 4,557,127 A   12/1985   Pietrelli
4,934,063 A    6/1990   Speisser
(Continued)

FOREIGN PATENT DOCUMENTS

CN   1507557 A   6/2004
CN   1967188 A   5/2007
(Continued)

OTHER PUBLICATIONS

International Search Report dated Oct. 31, 2018 issued in corresponding PCT/IB2018/054682 application (4 pages).
(Continued)

*Primary Examiner* — Michael V Kerrigan
(74) *Attorney, Agent, or Firm* — Millen, White, Zelano & Branigan, P.C.; William Nixon; Christin Montfort

(57) ABSTRACT

A system and method for designing a customized vehicle repair configuration for effectively measuring and repairing the structure of a damaged vehicle body is disclosed. The system provides a vehicle repair assembly comprising a universal jig assembly, that allows the user to diagnose the damage of the repair structure or vehicle body. The vehicle repair assembly comprises a support frame, the jig assembly, a plate and a height adapter. After diagnosis of the vehicle body, the system is configured to customize the jig assembly respective of the repair structure to generate a customized vehicle repair assembly. The system is further configured to
(Continued)

provide edit access to the generated customized vehicle repair assembly to a number of users to tune the generated vehicle repair configuration.

15 Claims, 16 Drawing Sheets

(56) References Cited

U.S. PATENT DOCUMENTS

| | | |
|---|---|---|
| 5,343,611 A | 9/1994 | Lager et al. |
| 7,810,245 B2 | 10/2010 | Henblad et al. |
| 7,920,944 B2 | 4/2011 | Gould et al. |
| 2003/0020759 A1 | 1/2003 | Cancilla et al. |
| 2005/0193252 A1 | 9/2005 | Cancilla et al. |
| 2007/0093947 A1 | 4/2007 | Gould et al. |
| 2010/0217616 A1 | 8/2010 | Colson et al. |
| 2016/0335816 A1 | 11/2016 | Thoppae et al. |

FOREIGN PATENT DOCUMENTS

| | | |
|---|---|---|
| CN | 101138772 A | 3/2008 |
| CN | 106104636 A | 11/2016 |
| CN | 106548260 A | 3/2017 |
| EP | 1930093 A1 | 6/2008 |
| FR | 2556248 A1 | 6/1985 |
| JP | 2003-99496 A | 4/2003 |
| WO | 9208572 A1 | 5/1992 |

OTHER PUBLICATIONS

English Abstract of JP 2003-99496 A published Apr. 4, 2003.
English Abstract of CN 106548260 A published Mar. 29, 2017.
Supp. EP search report in corresponding EP18823989 dated Feb. 26, 2021 (pp. 1-10).
Office action in corresponding CN 201880043028.X dated Sep. 1, 2021 (pp. 1-23) and english translation thereof (pp. 1-5).
Celette: Collision repair and restoration solution: "Frame Machine Griffon by Celette, the Celette bench to use with jigs system or universal jig", Nov. 15, 2012 (Nov. 15, 2012), pp. 1-5, XP054981468, Retrieved from the Internet: URL:https://www.youtube.com/watch?v=sNIF69 7mzF8 [retrieved on Feb. 25, 2021].
Celette, Car life Solution reference : https://v.youku.com/v_show/id_XNjgwMj/5OTc2.html?spm=a2hcb.profile.app.5~5!2~5~5!3~5!2~5~5!45~A!2&qq-pf-to=pcqq.c2c downloaded from internet Mar. 3, 2014.

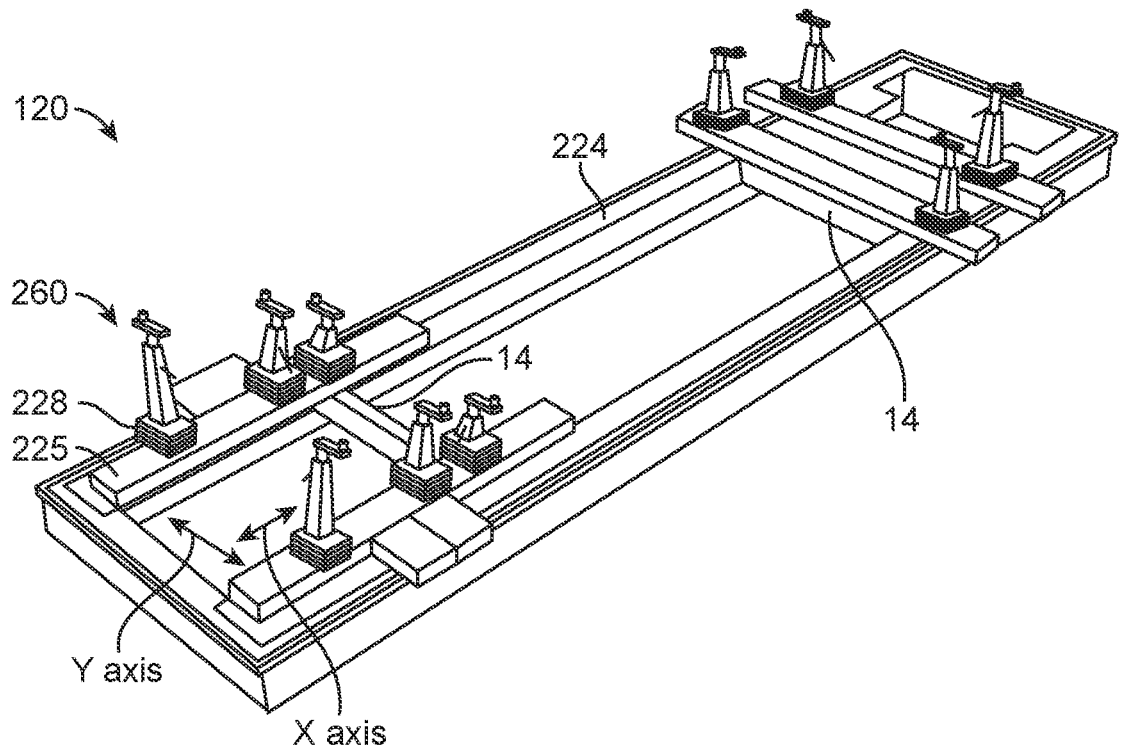
FIG. 3
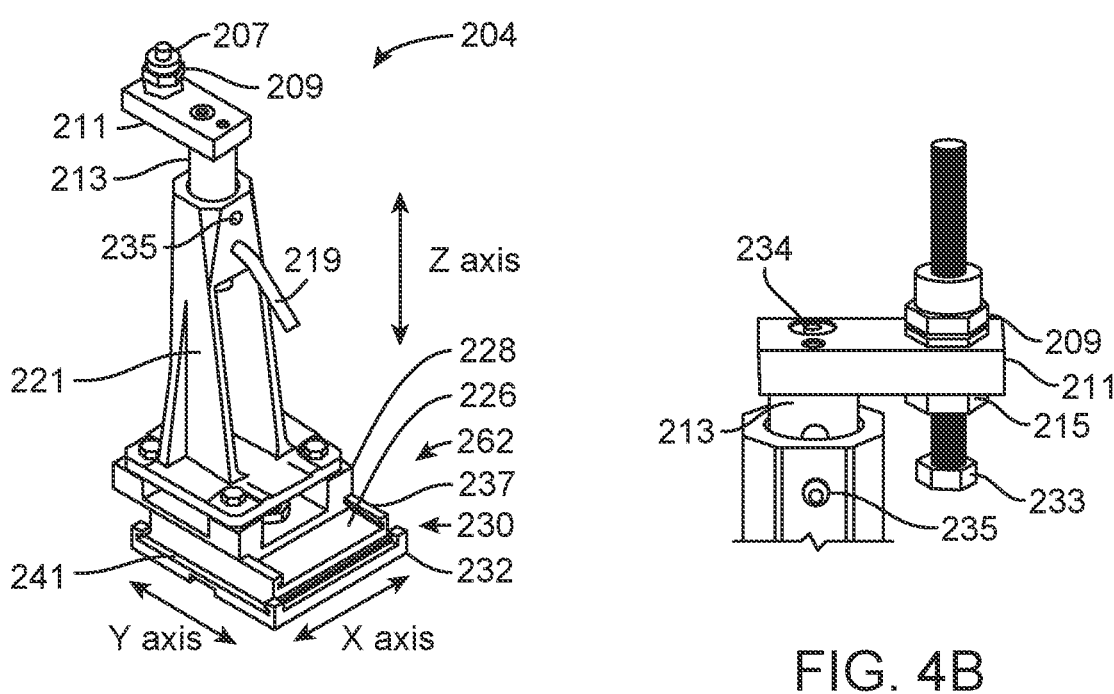
FIG. 4A
FIG. 4B

SYSTEM AND METHOD FOR DESIGNING A CUSTOMIZED VEHICLE REPAIR CONFIGURATION

BACKGROUND OF THE INVENTION

A. Technical Field

The present invention generally relates to a vehicle body repair system, and more specifically relates to a system and method for designing a customized vehicle repair configuration for effectively measuring and repairing the structure of a damaged vehicle body.

B. Description of Related Art

As original equipment manufacturers produce additional new models of cars, it becomes increasingly difficult for vehicle repair shops to provide a dedicated vehicle repair assembly solution for fixing structural damage to a body of a vehicle. Although many measuring systems are approved officially by manufacturers, most vehicle body repair shops purchase the measuring systems and never end up using them.

Training for conventional measuring systems is tedious and cumbersome and requires experienced operators. Such experienced operators are difficult to find. Additionally, conventional measuring system require a specific jig for securing to or checking portions of the vehicle body. Unfortunately, a specific jig is required for each vehicle type that is to be repaired. Thus, operators of vehicle repair shops are required to carry various jig assemblies to service a specific vehicle type. This practice leads to higher costs and inefficient operations. Further, conventional vehicle repair system need a printed datasheet, showing fix values of each jig. In that way there is no possibility to adapt the jig to the real repair configuration.

Thus, there is still a need in the art for a system and method for providing a universal jig configuration that allows an operator to utilize a single jig on a variety of different vehicles to reduce costs and efficiently repair damaged vehicles. Further, there is a need for a system and method for customizing the design of the universal jig configuration, by which the jig could be adapted to any repair structure or vehicle body.

SUMMARY OF THE INVENTION

A system and method for designing a customized vehicle repair configuration or assembly for effectively measuring and repairing the structure of a damaged vehicle body, is disclosed. The system provides a vehicle repair assembly comprising a universal jig assembly, that allows the user to diagnose the damage of the repair structure or vehicle body.

According to the present invention, the vehicle repair system comprises a vehicle repair unit and at least one database. The vehicle repair unit or server comprises a processor and a memory unit. The memory unit comprises a set of program modules comprises a registration module, a vehicle type selector module, a diagnosis module, a customization module, a layout module and a collaboration module. In an embodiment, a user access server from a user terminal via a network. In an embodiment, the network is at least anyone of a Wi-Fi network, WiMAXs network, wireless local area network. In an embodiment, the user terminal is at least anyone of a desktop, a laptop, a tablet, a mobile phone, mobile and/or handheld electronic devices, personnel digital assistants, smart phones, smart televisions, palm tops and phablets.

The registration module, executed by the processor, configured to allow the user to register by providing relevant information to identify the user and the vehicle. The vehicle type selector module, executed by the processor, configured to enable a user to select a make, and model of the vehicle. The diagnosis module, executed by the processor, configured to display a screen comprising a vehicle repair assembly to allow the user to diagnose a damage on the selected vehicle, wherein the vehicle repair configuration comprises plurality of components including, a support frame for designing a vehicle repair configuration, wherein the support frame comprises, a pair of parallel longitudinal members, and at least one elongated cross member secured to an upper surface of one of the parallel longitudinal members.

The component further comprises a jig assembly, including an adjustable platform slidably mounted to the elongated cross member, a tower member mounted to the adjustable platform, a piston mounted perpendicularly to the adjustable platform and rotatably received within a through hole of the tower member, a plate having a first end connected about a distal end of the piston and a second end opposite the first end, and a height adaptor pivotably mounted to the second end and operatively connected to a socket. The adjustable platform further comprises a mounting plate mounted to the elongated cross member, and a slide assembly slidably mounted to the mounting plate and having a longitudinal slide and a transverse slide, wherein the jig assembly is movable along the longitudinal slide and transverse slide in the longitudinal and transverse directions, respectively. A screw adaptor for adjustably securing a screw to the plate.

The customization module, executed by the processor, configured to enable the user to customize each components of the jig prototype respective of the selected vehicle to generate the customized vehicle repair assembly. The collaboration module, executed by the processor, configured to provide edit access to number of users to tune the designed vehicle repair configuration. The layout module, executed by the processor, configured to generate a layout of the designed vehicle repair configuration.

In one embodiment, a method for designing a customized vehicle repair configuration is disclosed. At one step, a user account by a user device, wherein the account including user information corresponding to an identification of the user account, is generated at a processor of a server, via a registration module. At another step, the user is enabled the user to select, a make, and model of the vehicle at the processor of the server, via a model selector module. At another step, a screen comprising a vehicle repair configuration to allow the user to diagnose a damage on the selected vehicle, is displayed at the processor of the server, via a diagnosis module. The vehicle repair configuration comprises plurality of components including, a support frame for designing a vehicle repair configuration, wherein the support frame comprises, a pair of parallel longitudinal members, and at least one elongated cross member secured to an upper surface of one of the parallel longitudinal members.

The vehicle repair assembly further comprises a jig assembly, including an adjustable platform slidably mounted to the elongated cross member, a tower member mounted to the adjustable platform, a piston mounted perpendicularly to the adjustable platform and rotatably received within a through hole of the tower member, a plate having a first end connected about a distal end of the piston and a second end opposite the first end, and a height adaptor pivotably mounted to the second end and operatively connected to a socket. At one step, the user is enabled to customize each components of the jig assembly respective of the selected vehicle to generate a design of the customized vehicle repair assembly, at the processor of the server, via a customization module. At one step, edit access is provided to number of users to tune the designed vehicle repair configuration via the collaboration module. At another step, a layout of the designed vehicle repair configuration generated, at the processor of the server, via a layout module.

The vehicle repair assembly in accordance with the subject disclosure provides a universal solution for measuring and repairing various vehicles. The subject disclosure could be used in conjunction with other existing tools such as a bench, cross members, towers, and pistons. Additionally, the vehicle repair assembly can be used to repair many materials such as steel, aluminum, carbon and fiber. In sum, the vehicle repair assembly provided by the subject disclosure is a low-cost solution for an initial investment. Specifically, the vehicle repair assembly is 2-3 times less expensive than conventional repair systems. Additionally, the assembly reduces the amount of time required for repairing the body of a vehicle. Advantageously, the subject disclosure allows a body shop to employ an operator without requiring specific training and skills for increasingly difficult repairs. As a result, there is a reduction in the cost of training while preserving the same accuracy level of a dedicated jig solution.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which:

FIG. 3 exemplarily illustrates a perspective view of a vehicle repair assembly for repairing a damaged vehicle body, according to an exemplary embodiment of the present invention.

FIG. 4A exemplarily illustrates a perspective view of a jig assembly, according to an exemplary embodiment of the present invention.

FIG. 4B exemplarily illustrates a screw fixing of the jig assembly, according to an exemplary embodiment of the present invention.

FIG. 12 exemplarily illustrates a screenshot for creating a user account and allowing the user to log into the vehicle repair unit, according to an exemplary embodiment of the present invention.

FIG. 13 exemplarily illustrates a screenshot of user information required to create an account, according to an exemplary embodiment of the present invention.

FIG. 21 exemplarily illustrates a screenshot indicating a type of points for customizing the vehicle repair assembly, according to an exemplary embodiment of the present invention.

FIG. 22 exemplarily illustrates a screenshot for controlling the visibility of toggle points, according to an exemplary embodiment of the present invention.

DETAILED DESCRIPTION OF EMBODIMENTS

Figure 1:
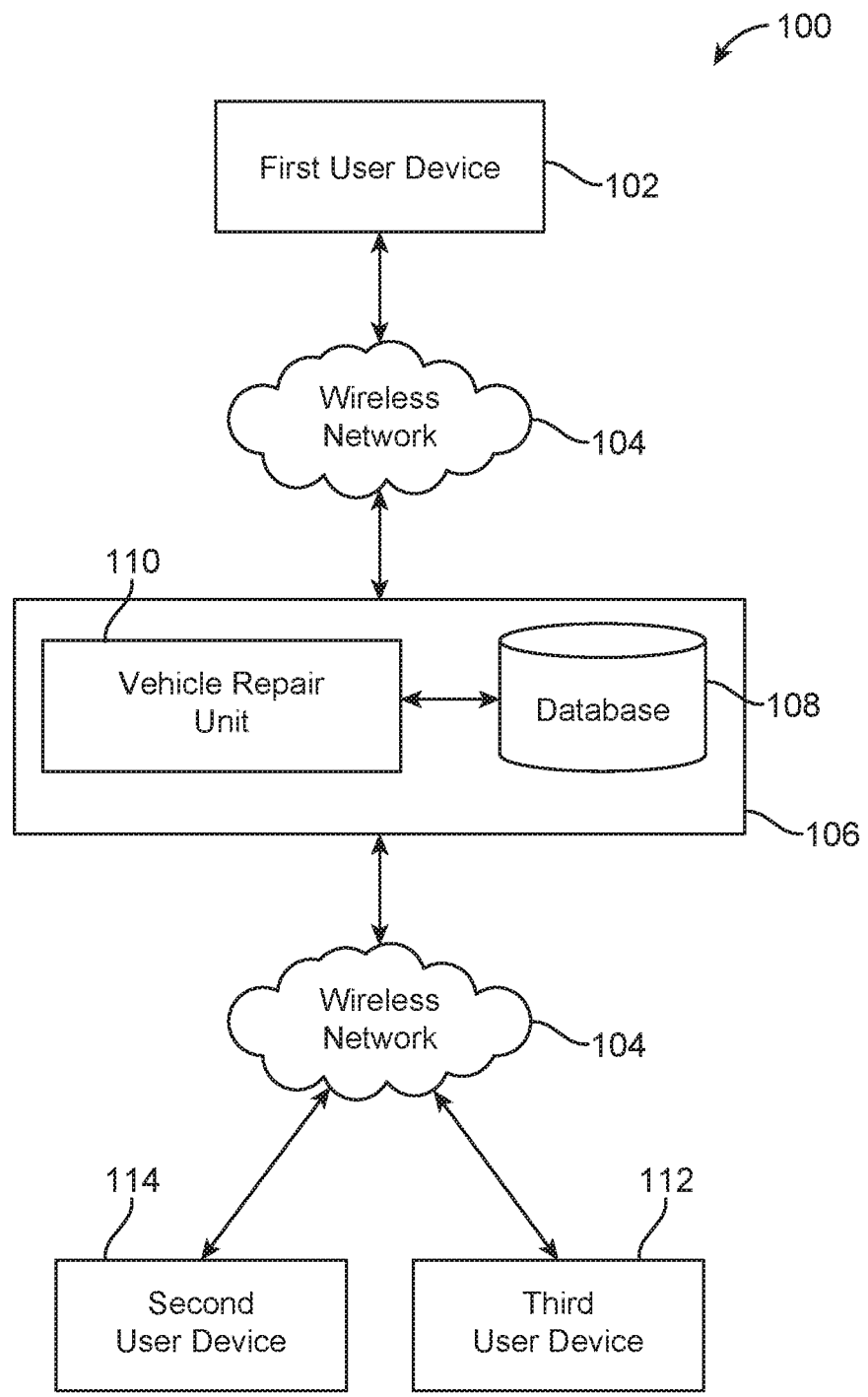
FIG. 1 exemplarily illustrates an environment of a system for designing a customized vehicle repair configuration, according to an exemplary embodiment of the present invention.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Exemplary embodiments of the disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated those individual aspects of the disclosure can be separately claimed.

The term "computer-readable medium" as used herein refers to any tangible storage and/or transmission medium that participates in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, all of the database functions may be stored within compartments of a single database or multiple databases. In any event, the disclosure is considered to include a tangible storage medium or distribution medium and known equivalents and successor media, in which the software implementations of the disclosure are stored.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import. "About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the exemplary embodiments can be presented in a range format. It should be understood that the description in range format is merely for convenience and brevity and should not be construed as an inflexible limitation on the scope of the exemplary embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the exemplary embodiments can be practiced without one or more of the specific features or advantages of a particular embodiment. In other instances, additional features and advantages may be recognized in certain embodiments that may not be present in all embodiments of the subject disclosure.

Referring to FIG. 1, an environment of a system for designing a customized vehicle repair configuration, according to an exemplary embodiment of the present invention, is disclosed. The environment 100 comprises a first user device 102, a vehicle repair system 106, wireless network 104, a second user device 114 and a third user device 112. In an embodiment, the vehicle repair system 106 comprises a vehicle repair unit 110 and at least one database 108.

In an embodiment, the first user device 102 is configured the vehicle repair system 106 for designing a customized vehicle repair configuration. In an embodiment, the first user device 102 is at least one of a desktop, a laptop, a tablet, a mobile phone, and mobile and/or handheld electronic devices. In an embodiment, the second user device 114 is at least one of a desktop, a laptop, a tablet, a mobile phone, mobile and/or handheld electronic devices. In an embodiment, the third user device 112 is at least one of a desktop, a laptop, a tablet, a mobile phone, mobile and/or handheld electronic devices. In an embodiment, the first user device 102, second user device 114 and the third user device 112 is in communication with the wireless network 104 to access the vehicle repair unit 110. In an embodiment, the wireless network 104 could be Wi-Fi network, WiMax network, wireless local area network.

In an embodiment, the at least one database 108 may be accessible by the vehicle repair unit 110. In an embodiment, the at least one database 108 may be integrated into the vehicle repair unit 110 or separate from it. In an embodiment, the database 108 resides in a connected server or in a cloud computing service. In an embodiment, regardless of location, the databases 108 comprise a memory to store and organize certain data for use by the vehicle repair unit 110. In some embodiment, the at least one database 108 stores user account information, plurality of vehicle information including make and model of vehicle, control points of car body structure and picture(s) or drawing(s) showing such control points.

In an embodiment, the vehicle repair unit 110 is at least one of a general or special purpose computer. In an embodiment, it operates as a single computer, which can be a hardware and/or software server, a workstation, a desktop, a laptop, a tablet, a mobile phone, a mainframe, a supercomputer, a server farm, and so forth. In an embodiment, the computer can be touchscreen and/or non-touchscreen and can run on any type of OS, such as iOS™, Windows™, Android™, Unix™, Linux™ and/or others. In an embodiment, the computer is in communication with wireless networks 104. Such communication can be via a software application, a mobile app, a browser, an OS, and/or any combination thereof. Further a block diagram of an exemplary implementation of the vehicle repair unit 110 of the vehicle repair system 106 is illustrated in FIG. 2.

Figure 2:
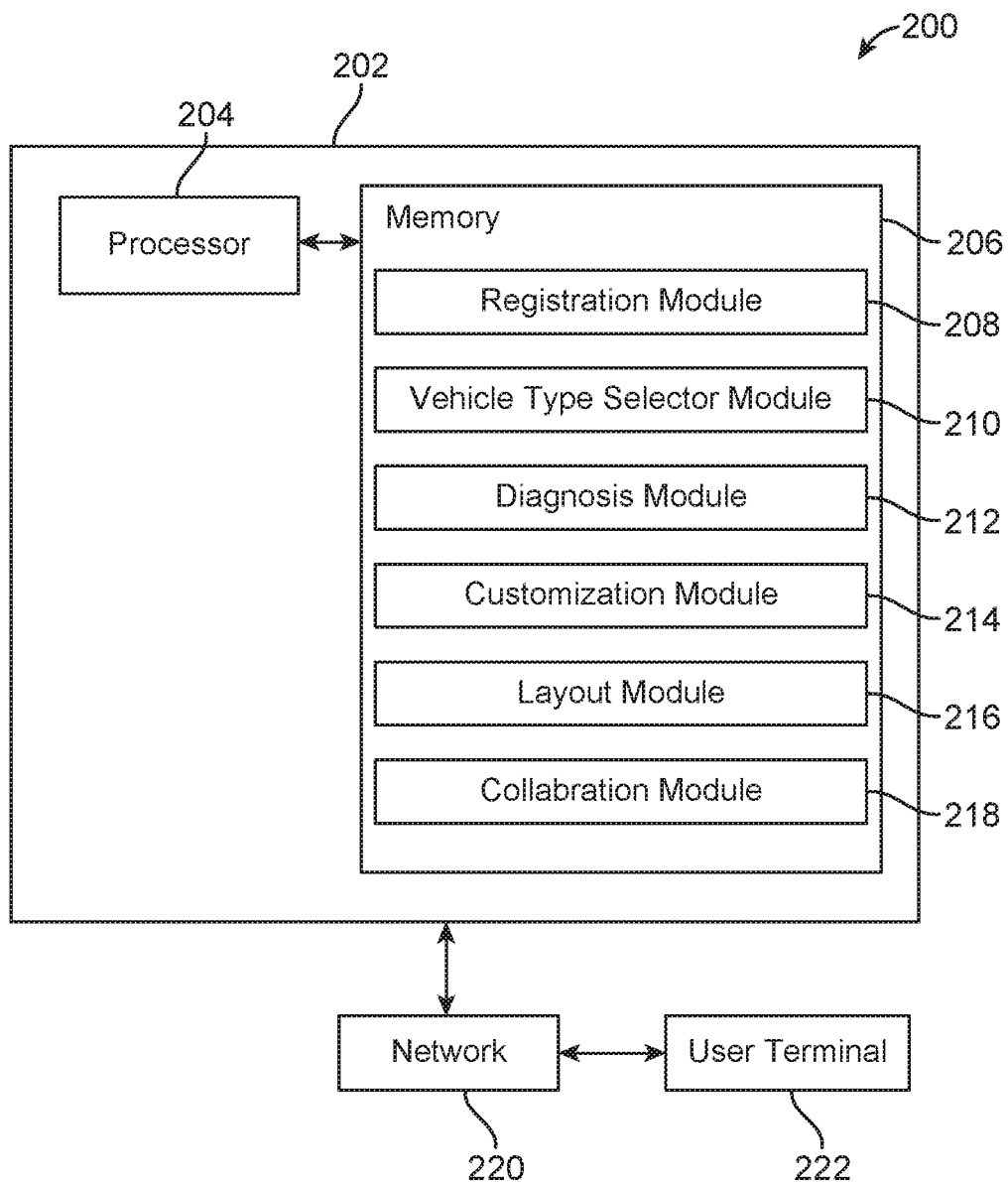
FIG. 2 exemplarily a block diagram of the vehicle repair unit, according to an exemplary embodiment of the present invention.

FIG. 2 is a block diagram 200 of a vehicle repair unit or server 202 in an embodiment of the present invention. The server 202 comprises a processor 204 and a memory unit 206. The memory unit 206 comprises a set of program modules comprises a registration module 208, a vehicle type selector module 210, a diagnosis module 212, a customization module 214, a layout module 216 and a collaboration module 218. In an embodiment, the user accesses access server 202 from a user terminal 222 via a network 220. In an embodiment, the network 220 is at least anyone of a Wi-Fi network, WiMax network, wireless local area network. In an embodiment, the user terminal 222 is at least anyone of a desktop, a laptop, a tablet, a mobile phone, mobile and/or handheld electronic devices, personnel digital assistants, smart phones, smart televisions, palm tops and phablets.

The registration module 208, executed by the processor, configured to allow the user to register by providing relevant information to identify the user and the vehicle. The vehicle type selector module 210, executed by the processor, configured to enable a user to select a make, and model of the vehicle. The diagnosis module 212, executed by the processor, configured to display a screen comprising a vehicle repair assembly to allow the user to diagnose a damage on the selected vehicle, wherein the vehicle repair configuration comprises plurality of components including, a support frame for designing a vehicle repair configuration, wherein the support frame comprises, a pair of parallel longitudinal members, and at least one elongated cross member secured to an upper surface of one of the parallel longitudinal members.

The component further comprises a jig assembly (260 as shown in FIGS. 3, 4A, and 4B), including an adjustable platform slidably mounted to the elongated cross member, a tower member mounted to the adjustable platform, a piston mounted perpendicularly to the adjustable platform and rotatably received within a through hole of the tower member, a plate having a first end connected about a distal end of the piston and a second end opposite the first end, and a height adaptor pivotably mounted to the second end and operatively connected to a socket. The adjustable platform further comprises a mounting plate mounted to the elongated cross member, and a slide assembly slidably mounted to the mounting plate and having a longitudinal slide and a transverse slide, wherein the jig assembly is movable along the longitudinal slide and transverse slide in the longitudinal and transverse directions, respectively. A screw adaptor for adjustably securing a screw to the plate.

The customization module 214, executed by the processor, configured to enable the user to customize each components of the jig prototype respective of the selected vehicle to generate the customized vehicle repair assembly.

The collaboration module 218, executed by the processor, configured to provide edit access to number of users to tune the designed vehicle repair configuration. The layout module 216, executed by the processor, configured to generate a layout of the designed vehicle repair configuration.

In one embodiment, a method for designing a customized vehicle repair configuration is disclosed. At one step, a user account by a user device, wherein the account including user information corresponding to an identification of the user account, is generated at a processor of a server, via a registration module. At another step, the user is enabled the user to select a, make, and model of the vehicle at the processor of the server, via a model selector module. At another step, a screen comprising a vehicle repair configuration to allow the user to diagnose a damage on the selected vehicle, is displayed at the processor of the server, via a diagnosis module. The vehicle repair configuration comprises plurality of components including, a support frame for designing a vehicle repair configuration, wherein the support frame comprises, a pair of parallel longitudinal members, and at least one elongated cross member secured to an upper surface of one of the parallel longitudinal members.

The vehicle repair configuration further comprises a jig assembly (260 as shown in FIGS. 3, 4A, and 4B), including an adjustable platform slidably mounted to an the elongated cross member, a tower member mounted to the adjustable platform, a piston mounted perpendicularly to the adjustable platform and rotatably received within a through hole of the tower member, a plate having a first end connected about a distal end of the piston and a second end opposite the first end, and a height adaptor pivotably mounted to the second end and operatively connected to a socket. The jig assembly 260 will be described in details below with reference to FIGS. 3-11. At one step, the user is enabled to customize each components of the jig assembly respective of the selected vehicle to generate a design of the customized vehicle repair assembly, at the processor of the server, via a customization module. At one step, edit access is provided to number of users to tune the designed vehicle repair configuration via the collaboration module. At another step, a layout of the designed vehicle repair configuration generated, at the processor of the server, via a layout module.

FIGS. 3-11 illustrate an exemplary embodiment of a vehicle repair assembly 120 for repairing a damaged vehicle. Specifically, the assembly is configured as a vehicle repair assembly for measuring and repairing structural damage to a vehicle but can alternatively be applied to any other vehicle having a body. In accordance with an aspect of the exemplary embodiment, the assembly includes a support frame 224, a jig assembly 260, a plate 211 and a height adaptor 209.

Referring now to FIG. 3, the assembly 120 includes the support frame 224 upon which the jig assembly 260 is mounted. As further discussed below, the jig assembly 260 is slidably mounted to the support frame 224. The support frame 224 is preferably configured as a substantially rectangular frame, as shown, corresponding to a vehicle body. However, the support frame 224 can be configured as any shape suitable for the foregoing intended use, e.g., square, triangular, trapezoidal and the like. In an exemplary embodiment shown in FIG. 3, the support frame 224 includes a pair of parallel longitudinal members 14 and at least one elongated cross member 225 secured to an upper surface of one of the parallel longitudinal members. The parallel longitudinal members 14 and the elongated cross member 225 are configured to be substantially rectangular, as shown. However, the longitudinal members 14 and the elongated cross member 225 can be configured as any shape suitable for their intended use.

The longitudinal members 14 are spaced apart and extend generally parallel to each other. The elongated cross member 225 is pivotably attached to the upper surface of one of the longitudinal members 14. In accordance with an exemplary embodiment, the elongated cross member 225 is configured to be connectable to the upper surface e.g., via fasteners. In accordance with an exemplary embodiment of the subject disclosure shown in FIGS. 3, 4A and 4B, the jig assembly 260 includes an adjustable platform 262 slidably mounted to the elongated cross member 225, a tower member 221 mounted to the adjustable platform 262, and a piston 213 mounted perpendicularly to the adjustable platform 262 and rotatably received within a through hole of the tower member 221. For purposes of illustration, only a single jig assembly 260 will be primarily described below. It is to be understood, however, that the assembly can include a plurality of jig assemblies (as shown in FIG. 3). In an exemplary embodiment shown in FIGS. 3-5, the adjustable platform 262 includes a mounting plate 228 mounted to the elongated cross member 225 and a slide assembly 230 slidably mounted to the mounting plate 228. In other words, the adjustable platform 262 is mounted to the elongated cross member 225 via the mounting plate 228. The mounting plate 228 is configured as a rectangular plate with a plurality of slots for receiving suitable fasteners, e.g., screws, pins, bolts, for affixing the adjustable platform 262 to the elongated cross member 225. As shown in FIGS. 3, 4A and 4B, the slide assembly 230 is slidably mounted to the mounting plate 228 and includes a longitudinal slide 232 and a transverse slide 237.

Figure 5:
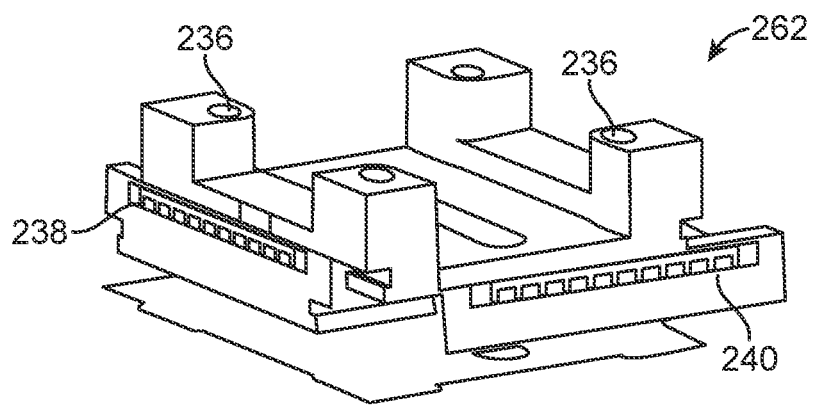
FIG. 5 exemplarily illustrates an adjustable platform of the assembly of FIG. 4A, according to an exemplary embodiment of the present invention.

The jig assembly 260 is movable along the longitudinal slide 232 and transverse slide 237 in the longitudinal and transverse directions, respectively. Specifically, the longitudinal slide 232 is movable in the direction of axis X on dovetailed slideways 241 formed integrally with the transverse slide 237. Additionally, the transverse slide 237 is movable in the direction of axis Y on dovetailed slideways 226 formed integrally with the mounting plate 228. The longitudinal and transverse slides 232, 237 can be secured into position with a suitable fastener, e.g., screws, pins, bolts, for securing the longitudinal and transverse slides 232, 237 in a fixed position. As shown in FIG. 5, the adjustable platform 262 includes a pair of measuring scales 238, 240 to measure the degree of movement in the direction of axis X and the direction of axis Y. In general, the adjustable platform 262 allows the jig assembly 260 to be adjusted in the direction of axis X and the direction of axis Y. In accordance with an aspect of the exemplary embodiment, the adjustable platform 262 can be moved about +/−50 millimeters on each axis but can alternatively be less than or greater than 218 millimeters e.g., +/−30, 40, 60, 70 millimeters. In accordance with an aspect, a single fastener can be utilized to limit movement of the adjustable platform 262 in the direction of axis X and the direction of axis Y.

The adjustable platform 262 may be constructed as a unitary piece or from multiple pieces, and may be manufactured (such as via casting or 3D printing) or handcrafted from any material(s) of sufficient strength and stiffness, such as metal (e.g., titanium, precious metals), silicone, plastic, resin, composites, rigid 3D printed materials, non-corrosive materials, stiff hypoallergenic materials, etc. As shown in FIGS. 3, 4A, and 4B, the tower member 221 is mounted to the adjustable platform 262 via suitable fasteners, e.g., screws, pins, bolts, and the like. As shown in FIG. 5, the adjustable platform 262 includes a plurality of apertures 236 for receiving a plurality of fasteners for securing the tower member 221 to the adjustable platform 262. The tower member 221 is a generally an elongated member having a longitudinal central axis. Additionally, the tower member 221 includes a through hole for receiving a piston therethrough, as further discussed below.

In accordance with an exemplary embodiment shown in FIGS. 3-5 the jig assembly 260 includes piston 213 mounted perpendicularly to the adjustable platform 262 and rotatably received within the through hole of the tower member 221. Specifically, the piston 213 is movable vertically in the direction of the axis Z. The piston 213 extends through the longitudinal slide 232 and transverse slide 237 and is movable in the directions X and Y together with the longitudinal and transverse slides 232, 237 respectively.

The piston 213 is locked into a desired position by a pin 219. Specifically, the piston 213 includes a plurality of slots (not shown) corresponding to a plurality of slots 235 (FIGS. 4A and 4B) on the tower member 221 for receiving the pin 219. The pin 219 is received through the slots on the piston 213 and the slots 235 on the tower member 221. As a result, the position of the piston 213 is adjustably secured along the axis Z. The predefined locations for the plurality of slots allow for increased accuracy during installation of the jig assembly. In accordance with an aspect of the exemplary embodiment, the piston 213 can be moved about +/−10 millimeters on the axis Z but can alternatively be less than or greater than 10 millimeters e.g., +/−8, 9, 11, millimeters. In sum, the piston 213 can be slidably adjusted along the axis Z such that the piston 213 is received within the tower member 221.

Figure 6:
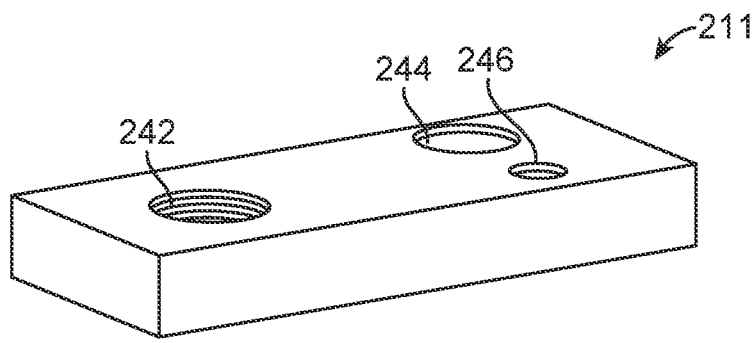
FIG. 6 exemplarily illustrates a perspective view of a plate of the assembly of FIG. 4A, according to an exemplary embodiment of the present invention.

As best shown in FIG. 3, the piston 213 is generally a cylindrical member having a longitudinal central axis and a circular cross-section. However, the piston 213 can have any shape cross-section such as hexagonal, polygonal or any other shape suitable for its intended purpose. The piston 213 can also be formed with a plurality of piston segments having different cross-sectional diameters. However, the piston 213 preferably has a uniform cross-sectional diameter. In accordance with an exemplary embodiment of the subject disclosure shown in FIGS. 3, 4A, 4B, and 6, the plate 211 includes a first end connected to a distal end of the piston 213 and a second end opposite the first end. Specifically, the first end of the plate includes a plurality of apertures 244, 246 for receiving protrusion 234 extending from a distal face of the piston 213. As best shown in FIGS. 4A, 4B and 6, the second end of the plate includes a threaded aperture 242 for receiving a height adaptor 209, as further discussed below. The plate 211 is generally rectangular, as shown in FIG. 6. The plate 211 is illustrated as generally planar, although it may be curved laterally or longitudinally. The apertures 244, 246, 242 are preferably circular and extend completely through plate 211. Although the plate is configured as shown in FIG. 6, it is to be understood that various shaped plates can be used to optimize engagement of the jig assembly with contact points on the body of a damaged vehicle. For example, the plate 211 may have curved lateral edges.

Figures 7, 8:
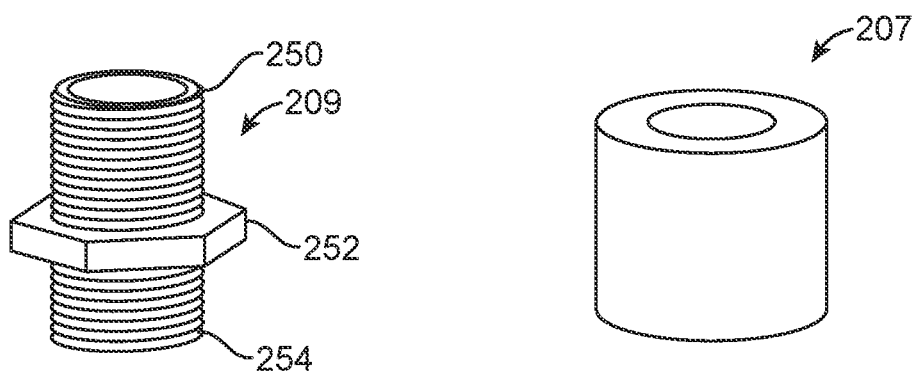
FIG. 7 exemplarily illustrates perspective view of a height adaptor of the assembly of FIG. 4A, according to an exemplary embodiment of the present invention.
FIG. 8 exemplarily illustrates a perspective view of a socket of the assembly of FIG. 4A, according to an exemplary embodiment of the present invention.
Figure 9:
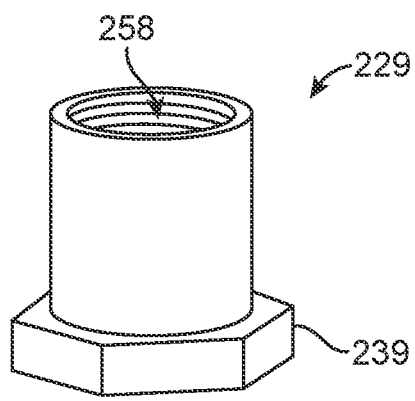
FIG. 9 exemplarily illustrates a perspective view of a screw adaptor of the assembly of FIG. 4A, according to an exemplary embodiment of the present invention.

Referring now to FIGS. 4A, 4B and 7, the height adaptor 209 is pivotably mounted to the second end and operatively connected to a socket 207. Specifically, the height adaptor 209 includes a threaded distal end 250 operatively engaged to the socket 207, and a threaded proximal end 254. The threaded proximal end 254 is threadedly engaged with threaded aperture 242 on the second end of the plate. The height adaptor 209 further includes a flange 252 positioned along a length of the height adaptor 209 and between the threaded distal end 250 and the threaded proximal end 254. The flange 252 has a larger cross-sectional diameter than the cross-sectional diameter of the threaded aperture 242 such that the flange 252 can engage a dorsal surface of the plate 211.

As discussed above and shown in FIGS. 3, 4A, 4B, 8 and 10, the height adaptor 209 is operatively connected the socket 207. Generally, the socket 207 is adjustably positioned such that the socket engages contact points on the body of a damaged vehicle. In an aspect, the socket 207 is threadedly engaged with the threaded distal end 250 of the height adaptor 209. The socket 207 can be adjusted along the axis Z by about 0 to 15 millimeters but can alternatively be adjusted by less than or greater than 15 millimeters e.g., +/−5, 10, 20, 25 millimeters. As best shown in FIG. 8, the socket 207 is generally a hollow cylindrical member having a longitudinal central axis and a circular cross-section. However, the socket 207 can have any shape cross-section such as hexagonal, polygonal or any other shape suitable for its intended purpose. It is to be understood that the assembly can include a plurality of sockets for engaging multiple contact points of the body of a damaged vehicle.

In general, the height adaptor 209 is for connection between the plate 211 and the socket 207. During use, if the jig assembly 260 engages the body of a vehicle, an operator can use various sized height adaptors depending on the particular vehicle body. Additionally, the socket 207 is configured to engage the body of a damaged vehicle at a plurality of contact points. In accordance with an exemplary embodiment of the subject disclosure shown in FIGS. 4A, 4B and 9, the assembly further includes a screw adaptor 229 threadedly engaged with the threaded aperture 242 of the plate 211. Additionally, the screw adaptor 229 has a threaded through hole 258 for adjustably securing a screw 233 extending therethrough. The screw adaptor 229 is used for adjusting the length of the screw 233 received therethrough and for tightening the screw 233 with the plate 211. Similar to the height adaptor 209, the screw adaptor 229 includes a flanged boss member 239 adjacent a distal end of the screw adaptor 229. The boss member 239 has a larger cross-sectional diameter than the cross-sectional diameter of the threaded aperture 242 such that the boss member 260 can engage a ventral surface of the plate 211.

In sum, the subject disclosure provides an assembly for measuring and repairing the body of a damaged vehicle. The subject disclosure also provides a method of measuring and repairing a body of a damaged vehicle using the assembly described above. In use, the subject disclosure provides a solution for measuring and repairing a body of a damaged vehicle using the assembly described above.

First, an operator receives a damaged vehicle from a customer. The operator then creates a customized jig assembly solution based on the vehicle type and model. Specifically, the operator looks up the particular vehicle and model in order to set an initial jig assembly solution tailored to the specific vehicle type. The jig assembly solution can be further customized based on user preferences such as a desired height offset and socket 207. Thereafter, the operator installs a plurality of jig assemblies at various locations along the support frame, e.g., bench, in accordance with the finalized jig assembly solution. The operator can utilize a plurality of sensors to facilitate installation of the jig assemblies on the support frame. Unlike conventional systems where the jig assembly solution is installed following a unique datasheet, the jig assembly solution of the subject disclosure is installed based on a large variety of datasheet/configuration integrated in the software/internet app, the operator has the opportunity to configure each jig following the repair situation. As a result, the jig assembly solution of the subject disclosure is more flexible and adapted to the real repair procedure.

It is to be understood that a plurality of jig assemblies can be used to simultaneously exert pulling forces on the body of a vehicle from multiple directions. For example, a plurality of jig assemblies can be positioned about a single end of a vehicle. Additionally, the orientation can be customized to suit the particular damaged areas of the body of a vehicle. Each jig assembly attaches to an adjustable control point of the damaged body of a vehicle. As discussed above, the jig assembly is held in position by the elongated cross member of the support frame. The elongated cross members are adjustably positioned in a specific range of locations on the bench relative to fixed points. As a result, the possibility of error during the installation of the jig assembly solution is reduced. Each jig assembly can be further adjusted to a plurality of special configurations via the adjustment platform. As discussed above, the adjustable platform can be slidably mounted to the elongated cross member of the support frame at various locations.

Figure 10:
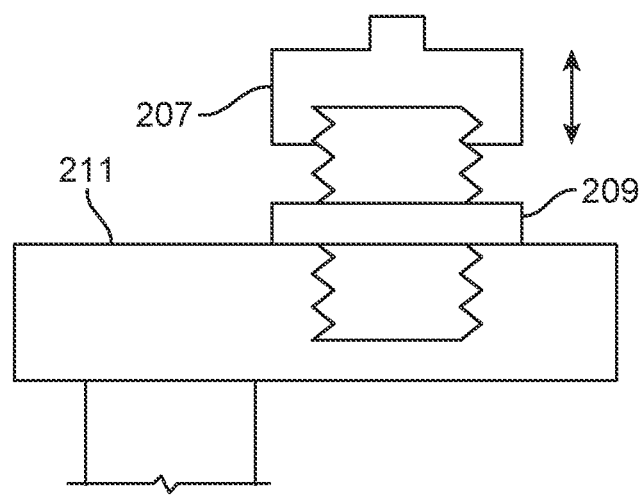
FIG. 10 exemplarily illustrates a simplified view of the assembly of FIG. 4A with certain parts omitted, according to an exemplary embodiment of the present invention.
Figure 11:
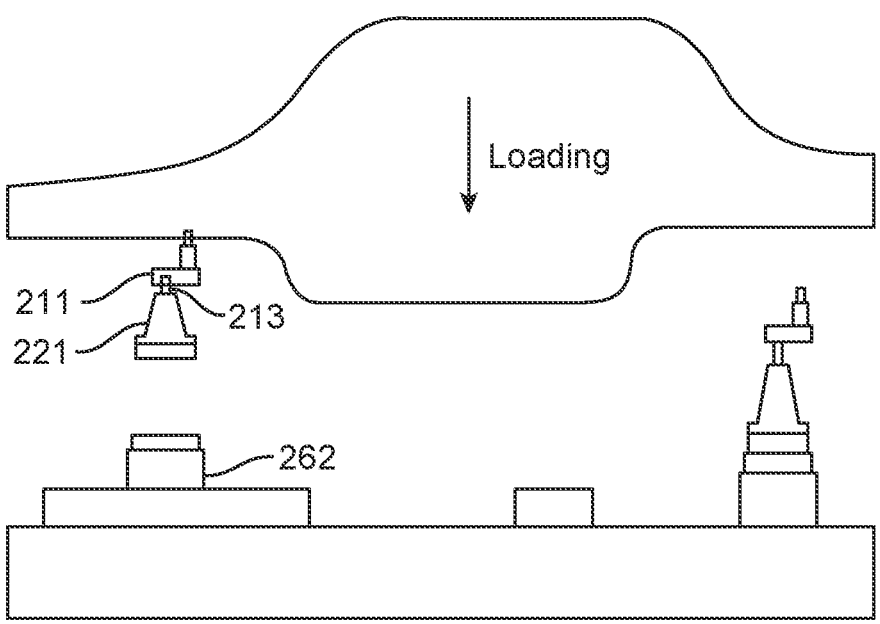
FIG. 11 exemplarily illustrates a simplified view of the assembly of FIG. 3 with certain parts omitted, in yet another embodiment of the present invention.

However, the jig assembly is also movable along the longitudinal slide and the transverse slide. Additionally, the piston of the jig assembly can be raised or lowered via the pin. As a result, a plurality of jig assemblies can be positioned in a plurality of positions to simultaneously measure and/or repair a plurality of vehicle body portions. The operator then validates the installation of the jig assembly solution on the support frame. Thereafter, the damaged vehicle is placed on the customized jig assembly solution installed on the support frame or the jig can be fixed directly to points on the damaged vehicle (as shown in FIG. 10). Once the vehicle is placed properly on the bench, the jig can be fixed to the adjustable platform. The position and orientation of the jig assemblies are further adjusted to better fit the damaged body areas of the vehicle to be repaired. Prior to beginning the repair, the operator generates a report based on the finalized placement of the jig assemblies as well as measurements taken from any sensors. Subsequently, the operator repairs the damaged vehicle body portions to proper positions until completion. The jig assemblies anchor and hold the body portions of the vehicle securely in place at adjustable control points, thereby allowing the operator to repair the damaged body areas of the vehicle to their proper position.

Finally, the operator generates a final report based on the jig assemblies and measurements in order to validate the repair work on the vehicle. Unlike conventional systems, the support frame, e.g., bench, of the subject disclosure has a machined surface with a tolerance of less than 0.7 millimeters. Generally, the machined surface of the bench facilitates the creation of an accurate jig assembly solution. As discussed above, the bench serves as a reference point to begin the repair process. In general, the machined surface allows the process of loading the damaged vehicle, positioning the cross members, and adjusting the plurality of jig assemblies including the tower and piston members, more efficient than conventional systems.

It is to be understood that the solution for measuring and repairing a body of a damaged vehicle using the assembly described above can be used with customized software to improve the accuracy and efficiency of repairing a damaged vehicle. For example, a dedicated software solution can be utilized by the operator when creating the customized jig assembly solution. Specifically, the operator can look up the particular vehicle model using the software to determine the initial jig assembly solution for a particular vehicle. Additionally, the software can be used to ensure that the finalized positions of the jig assemblies correspond to the original dimensions of the particular vehicle. The customized software can also be used to validate previously created jig assembly solutions. In sum, a customized software solution facilitates the initial installation of the jig assembly and allows an operator to make further adjustments to tailor the jig assembly solution to the particular vehicle being repaired.

Figures 12, 13:
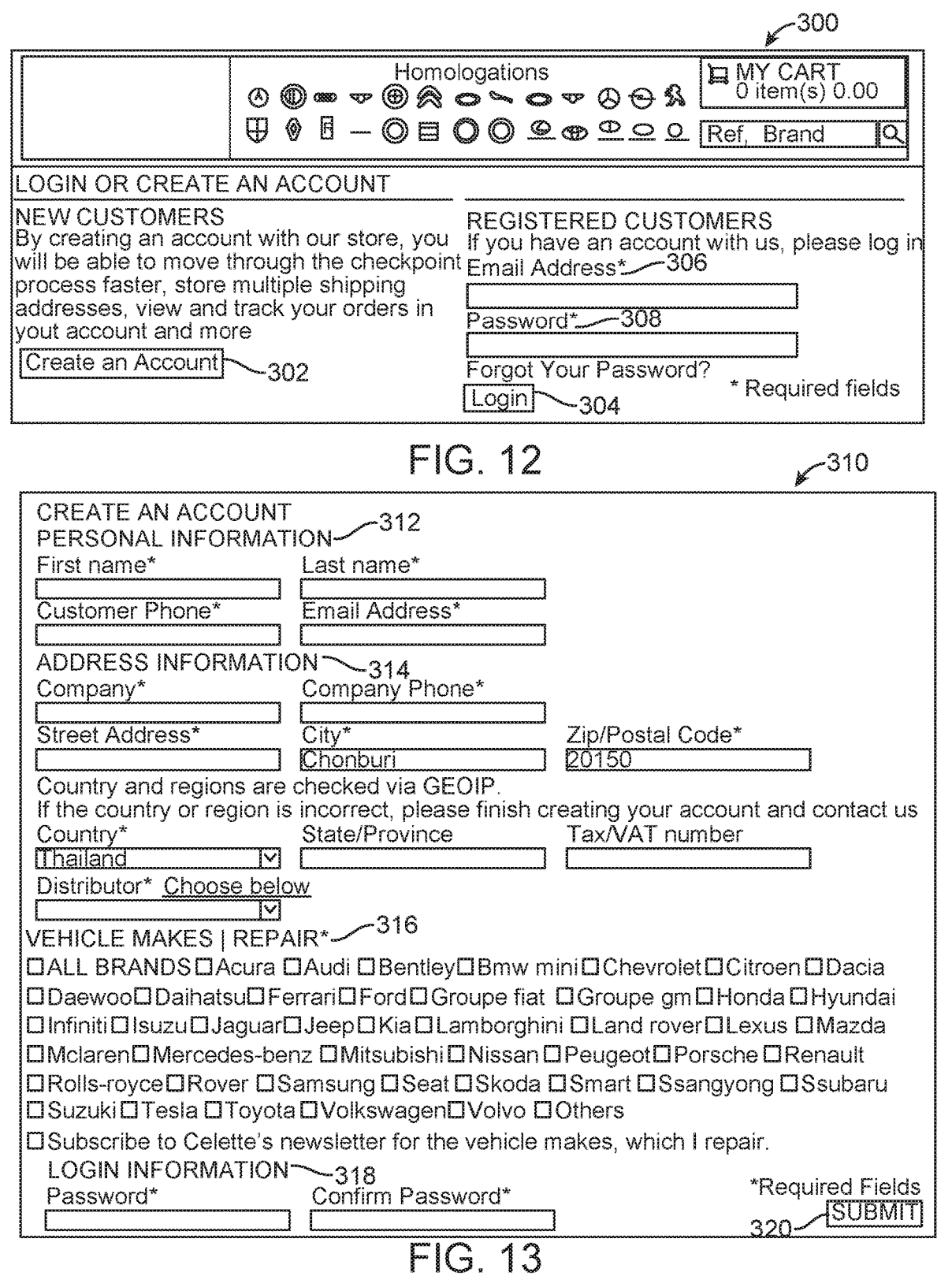

FIG. 12 exemplarily illustrates a screenshot 300 for creating a user account and allowing the user to log into the vehicle repair unit, in an embodiment of the present invention. FIG. 13 exemplarily illustrates a screenshot 310 of user information required to create an account in an embodiment of the present invention. If the user selects the "create an account" 302 options at the welcome screen, the user could create a new account in an account creation operation. Referring to FIG. 13, the user could enter relevant identification such as personal information 312, address information 314, vehicle information 316, and login information 318 (collectively, "user account information") for creating the user account. The user is enabled to submit the user account information by clicking the submit button 320. In one embodiment, for activation of the account email address of the user is sent to an administrator of the system. In one embodiment, if the user selects to login 304 into the system, the login information such as email address 306 and password 308 need to be provided to access the system.

Figure 14:
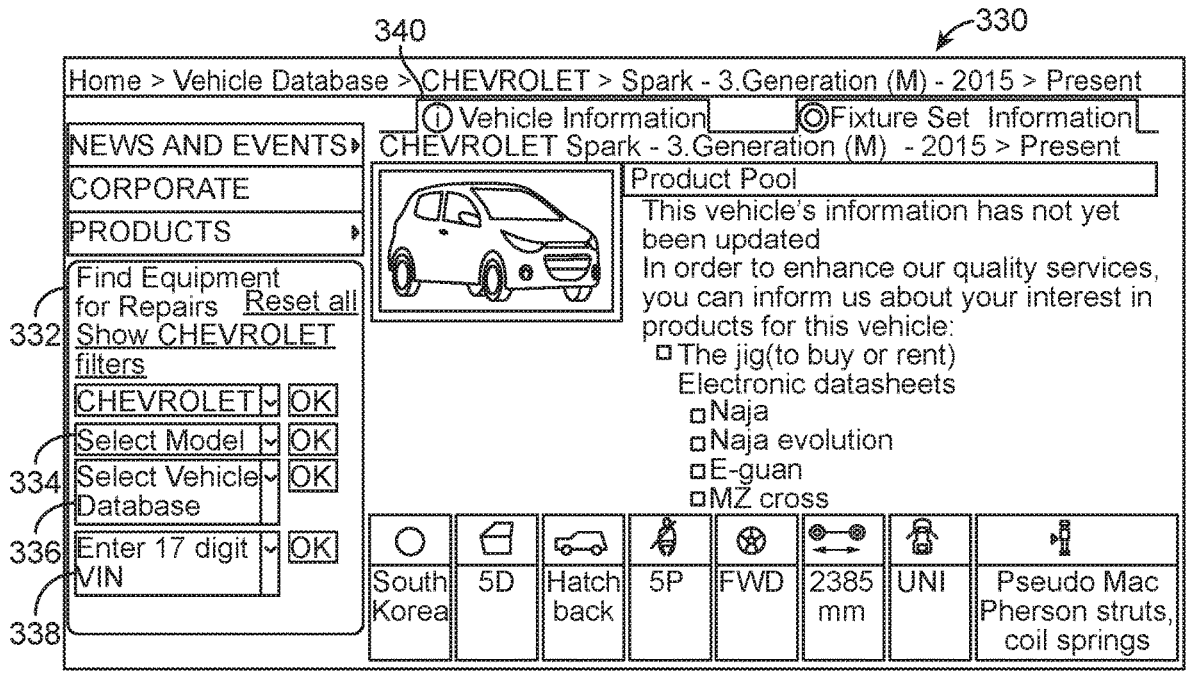
FIG. 14 exemplarily illustrates a screenshot for selecting make and model of the vehicle and display of the selected model, according to an exemplary embodiment of the present invention.

FIG. 14 exemplarily illustrates a screenshot 330 for selecting make and model of the vehicle and display of the selected model, according to an embodiment of the present invention. Using, find equipment for repair option 322, select model 334, select vehicle database 336 and PIN 388, user could identify the desired make and model of the vehicle. On successful entering the information, the vehicle type 340 is displayed.

Figure 15:
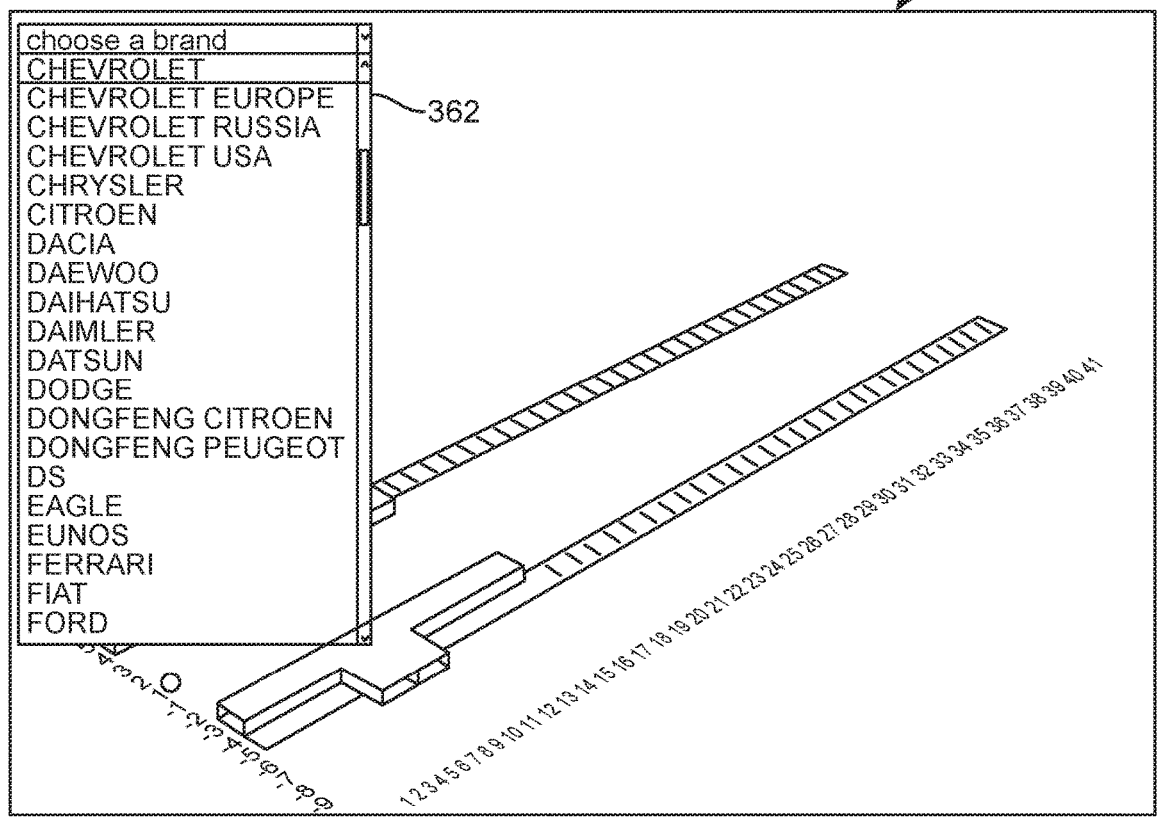
FIG. 15 exemplarily illustrates a screenshot for selecting the make of the vehicle, according to another embodiment of the present invention.
Figure 16:
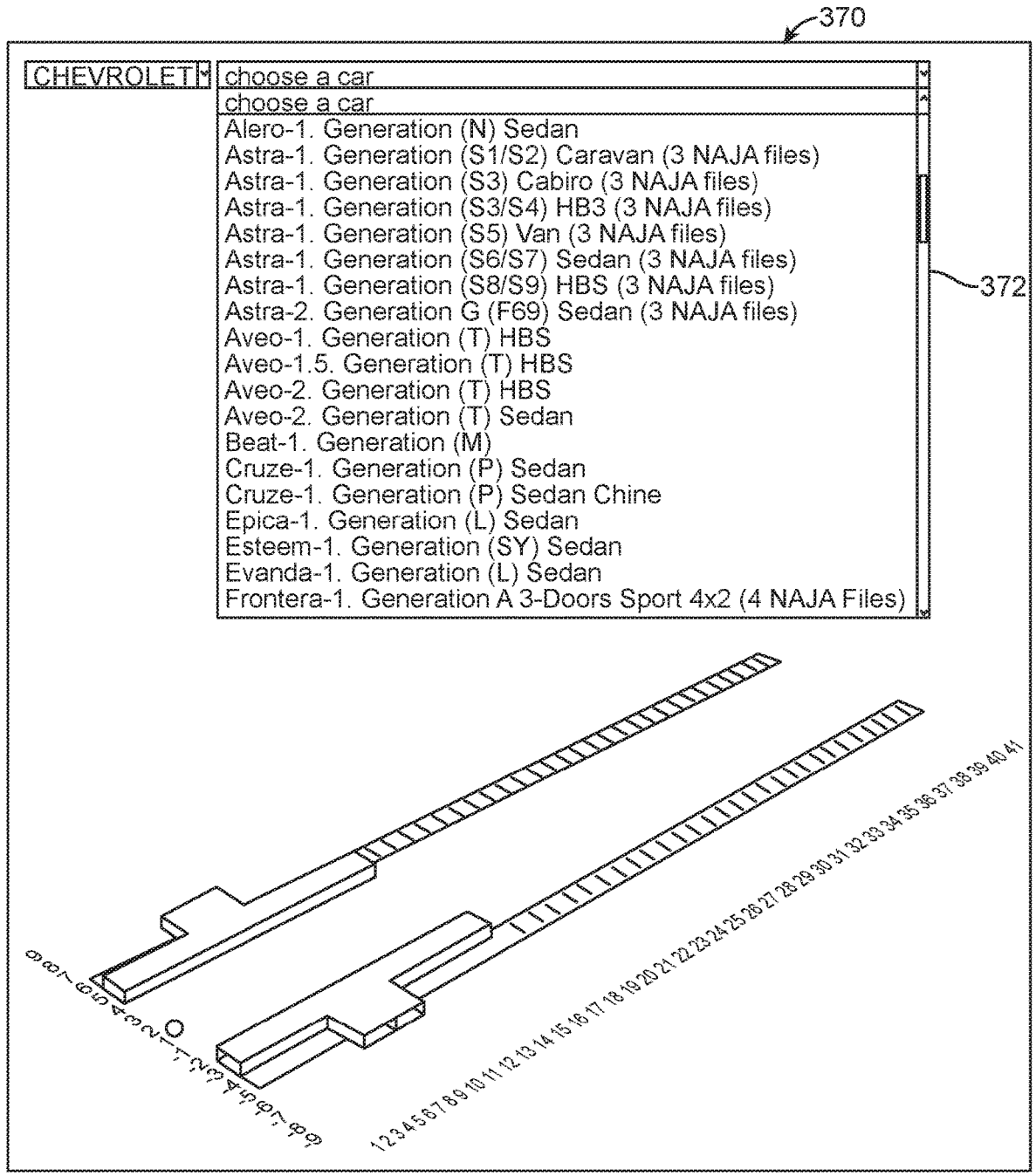
FIG. 16 exemplarily illustrates a screenshot for selecting the model of the vehicle, according to another embodiment of the present invention.
Figure 17:
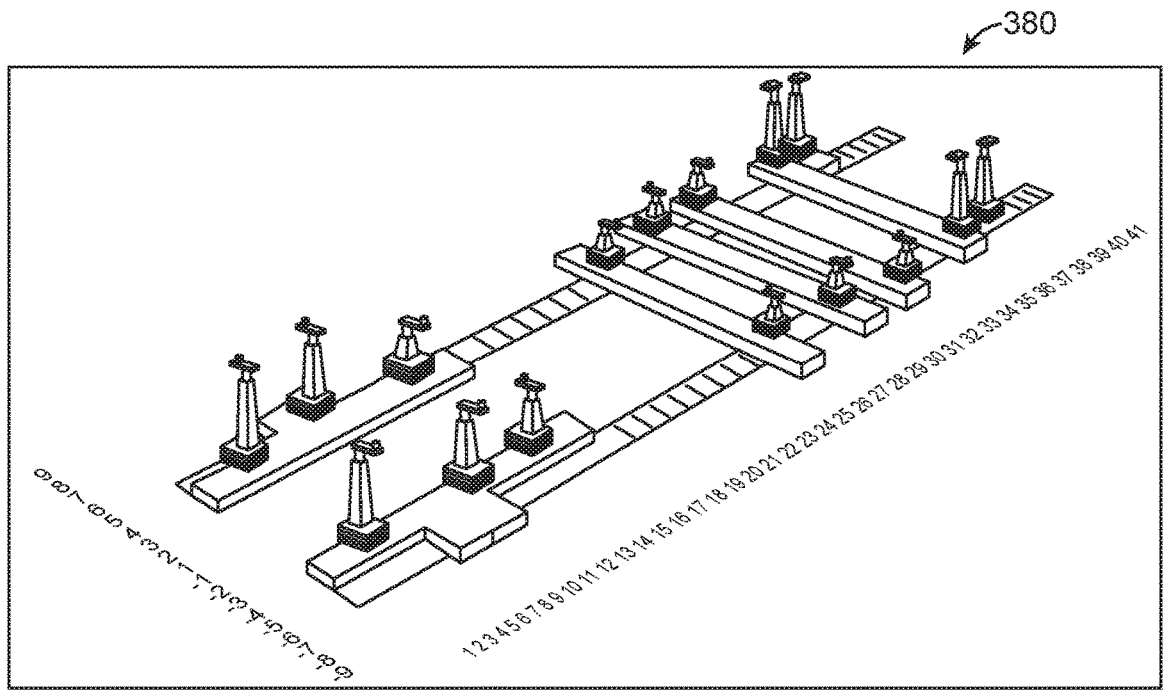
FIG. 17 exemplarily illustrates a screenshot of vehicle repair assembly, according to an exemplary embodiment of the present invention.
Figure 18:
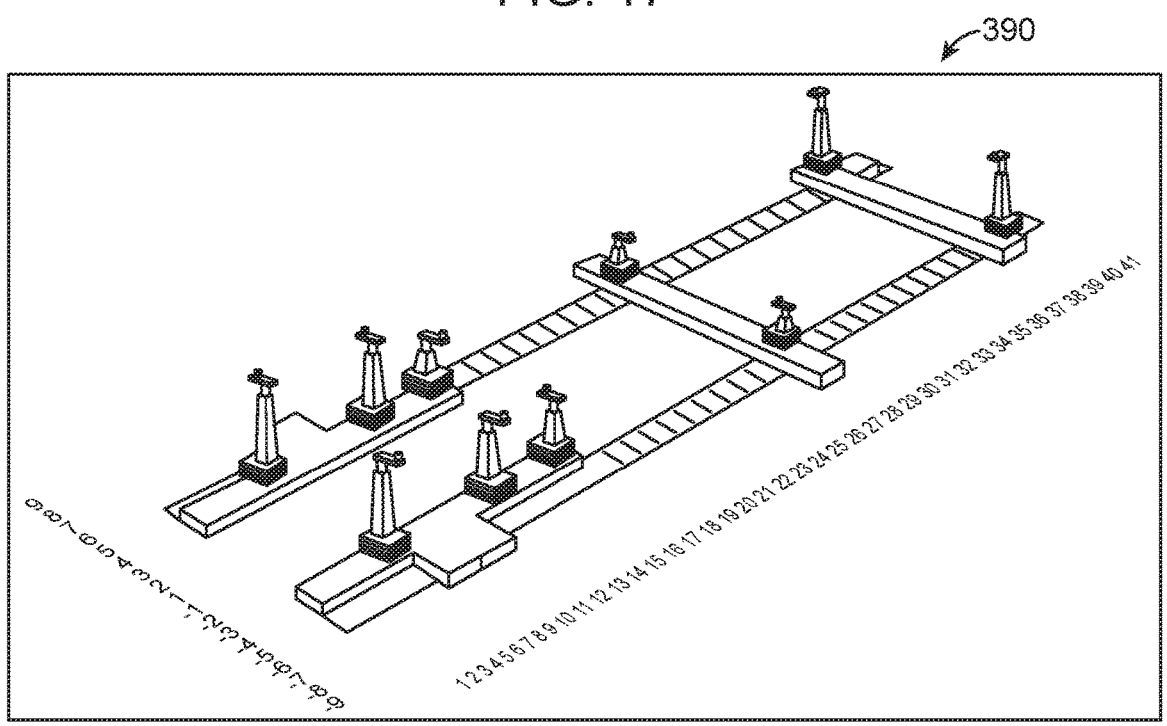
FIG. 18 exemplarily illustrates a screenshot of vehicle repair, according to another embodiment of the present invention.
Figure 19:
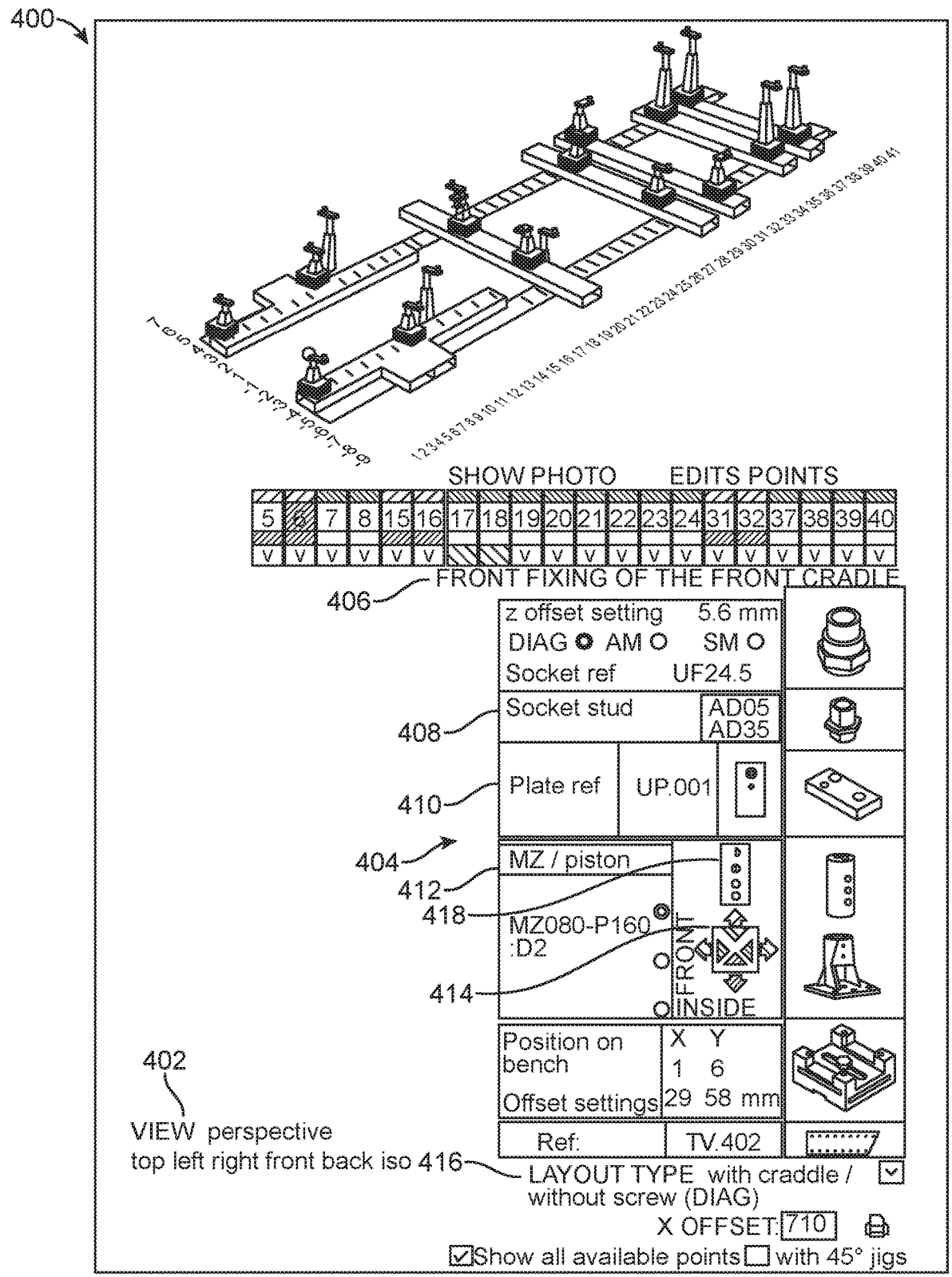
FIG. 19 exemplarily illustrates a screenshot comprising customization option for customizing the vehicle repair assembly, according to an exemplary embodiment of the present invention.

In one embodiment, on successful login into the system by the user, a 3D screen comprising vehicle repair assembly is displayed. In another embodiment, after login, the user could select vehicle type from the 3D screen as shown in FIG. 15 and FIG. 16. FIG. 15 exemplarily illustrates a screenshot 360 for selecting the model of the vehicle 362 directly from the 3D screen for customizing vehicle repair assembly, according to another embodiment of the present invention. FIG. 16 exemplarily illustrates a screenshot 370 for selecting the make of the vehicle 372 directly from the 3D screen for customizing vehicle repair assembly, according to another embodiment of the present invention. FIG. 17 exemplarily illustrates a screenshot 380 of general vehicle repair assembly displayed to the user for customizing the assembly according to an embodiment of the present invention. FIG. 18 exemplarily illustrates a screenshot 390 of vehicle repair assembly displayed to the user for customizing the assembly according to another embodiment of the present invention.

FIG. 19-26 exemplarily illustrates a screenshot of application executing in a hardware computing device for customizing the vehicle repair assembly in an embodiment of the present invention. The 3D screen area for customizing each point of the vehicle repair assembly respective to the selected vehicle is displayed and the customization options 401 are displayed at the side of the 3D screen area. During customization, the selected point, unselected point and disabled point are represented with different colors such as green, blue or opaque blue or shading. In on embodiment, socket types are indicated with different colors for easy understanding, which is provided between the v tab and toggle point. A popup message will indicate the color coding when the cursor paused over the respective shaded boxes. In one embodiment, blue indicates a male socket that is a pilot hole under the car body, green indicates a female socket, which is a screw head under the car body, golden yellow indicates a screw with socket (not shown in figures). Further, during selection of a particular point, technical name of the point is displayed 406.

The fixing parameters of sliding block on the crossmember over the bench, depends on hole positions in x and y direction of the cross members. In case, the X Value is above 12, the value represents the position of the Crossmember fixing on the bench. In one embodiment, the provided screenshot, MZ Tower MZ080, Piston P100 and Pin Position C1 is selected. However, the tower-piston configuration could be changed. In the event of any mechanical component obstruction, it is possible to move the position or turn the orientation of MZ Tower 412. In one embodiment, the orientation status of MZ 412 such as default position, possible to move the position, not possible move the position is displayed to the user using different color representation or patterns 414. Also, moving the MZ tower position requires re-adjustment of the values in Offset Setting. Further, Pin fixing position C1 could be represented as Circle 418 filled with different colors or pattern.

Figure 20:
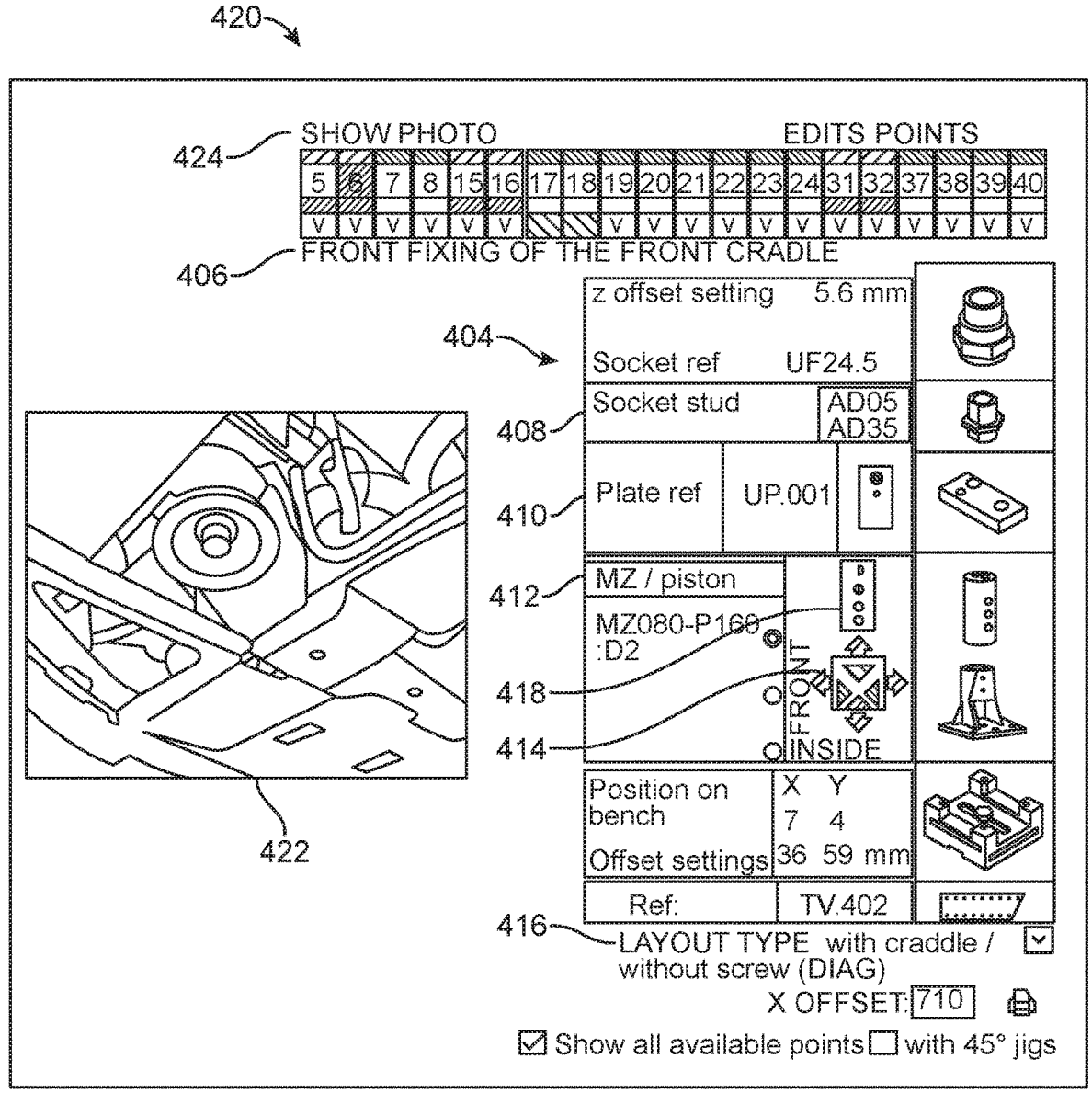
FIG. 20 exemplarily illustrates a screenshot for displaying a control point of the vehicle body, according to an exemplary embodiment of the present invention.
Figures 21, 22:
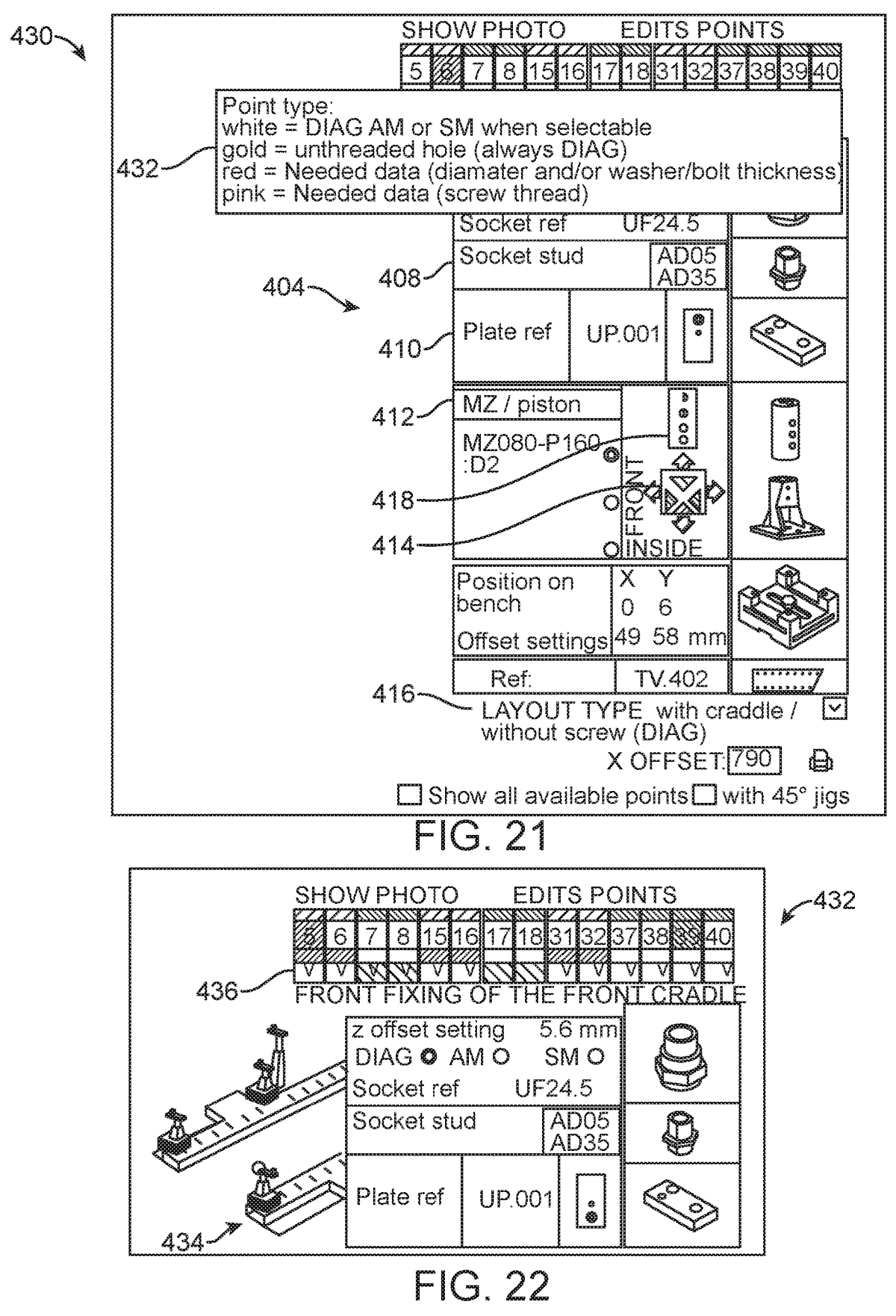
Figure 23:
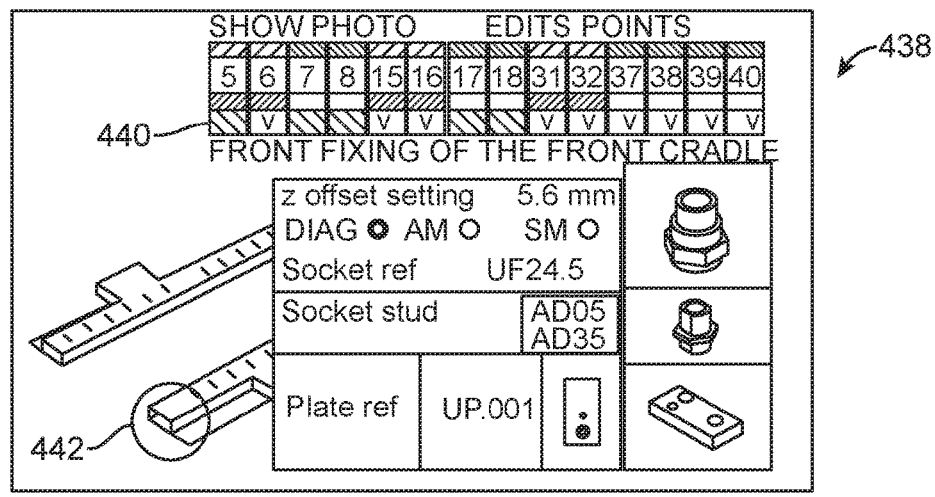
FIG. 23 exemplarily illustrates a screenshot controlling the visibility of toggle points to hide a point and jig in a diagnosis screen, according to an exemplary embodiment of the present invention.

In one embodiment, a cradle fixing point could be controlled in three different ways, which includes diagnostic purpose only (DIAG), diagnostic & anchoring by using a screw (AM), Sanchoring without cradle by using a screw (SM). The desired option could be selected using layout type tab 416. FIG. 20 exemplarily illustrates a screenshot 420 for displaying a control point 422 of the vehicle body for diagnosing the vehicle body, according to an embodiment of the present invention. FIG. 21 exemplarily illustrates a screenshot 430 indicating a type of points for customizing the vehicle repair assembly and details 432 regarding the point being displayed on selecting the point, according to an embodiment of the present invention. FIG. 22 exemplarily illustrates a screenshot 432 for controlling the visibility of toggle points 434 according to an embodiment of the present invention. FIG. 23 exemplarily illustrates a screenshot 440 controlling the visibility of toggle points to hide a point and jig in a diagnosis screen 442, according to an embodiment of the present invention. On clicking the V tap respective to the toggle point 434, enables a user to hide or unhide a particular toggle point.

Figure 24:
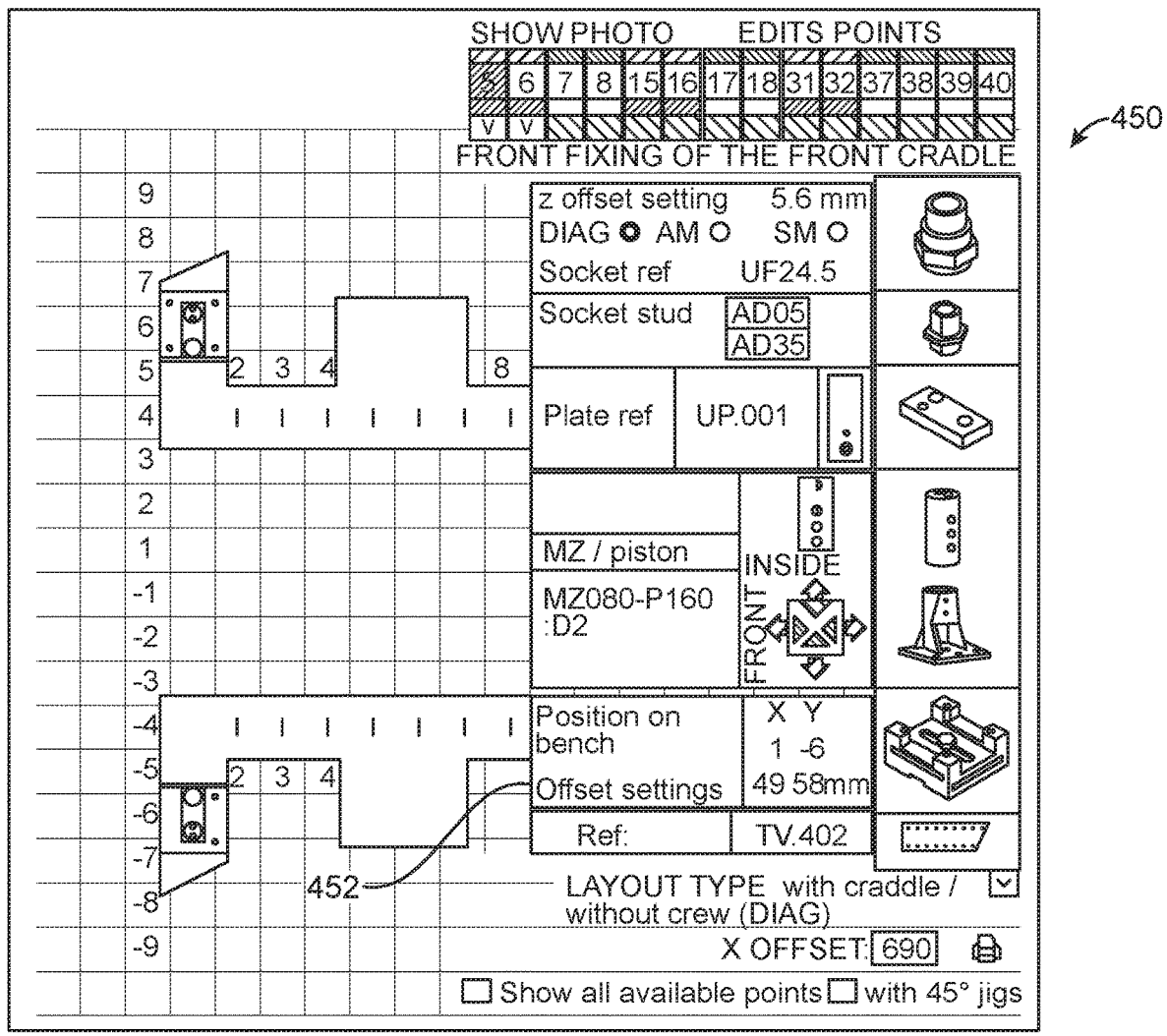
FIG. 24 exemplarily illustrates a screenshot customizing offset setting of the vehicle repair assembly, according to an exemplary embodiment of the present invention.
Figure 25:
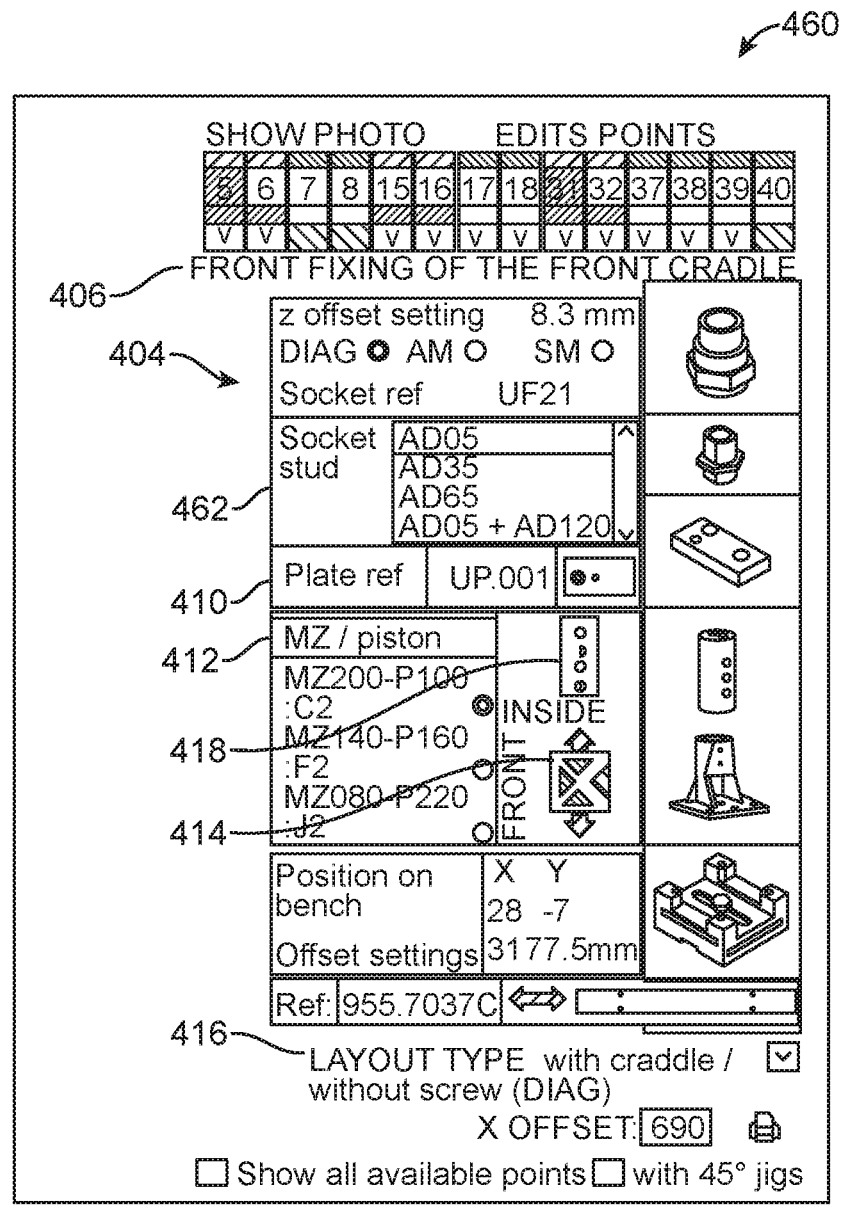
FIG. 25 exemplarily illustrates a screenshot for customizing socket stud of the vehicle repair assembly, according to an exemplary embodiment of the present invention.

FIG. 24 exemplarily illustrates a screenshot 450 customizing offset setting 452 of the vehicle repair assembly according to an embodiment of the present invention. In one embodiment, the sliding block in X & Y directions as per the value mentioned below X 0 [Front]>100 [Rear] mm
Y 0 [Inside]>100 [Outside] mm FIGS. 19-25 exemplarily illustrates a screenshot 460 for customizing socket stud 408 of the vehicle repair assembly according to an embodiment of the present invention. UP.001 Plate 410 is used for socket 408 and stud fixing. As, shown, AD05 Socket Stud to be used as per the default configuration. For example, in case of any obstruction it is possible to increase the space between the socket 462 and plate UP.00X 410, by switching to AD35. Further, MZ tower and piston pin position 412 would change while switching the Socket Stud 408. The switch of Socket Stud is illustrated in FIG. 25, represented as 462. In one embodiment, Socket UF21 is used and the offset setting value is adjusted to 8.3 mm in the stud AD05.

Figure 26:
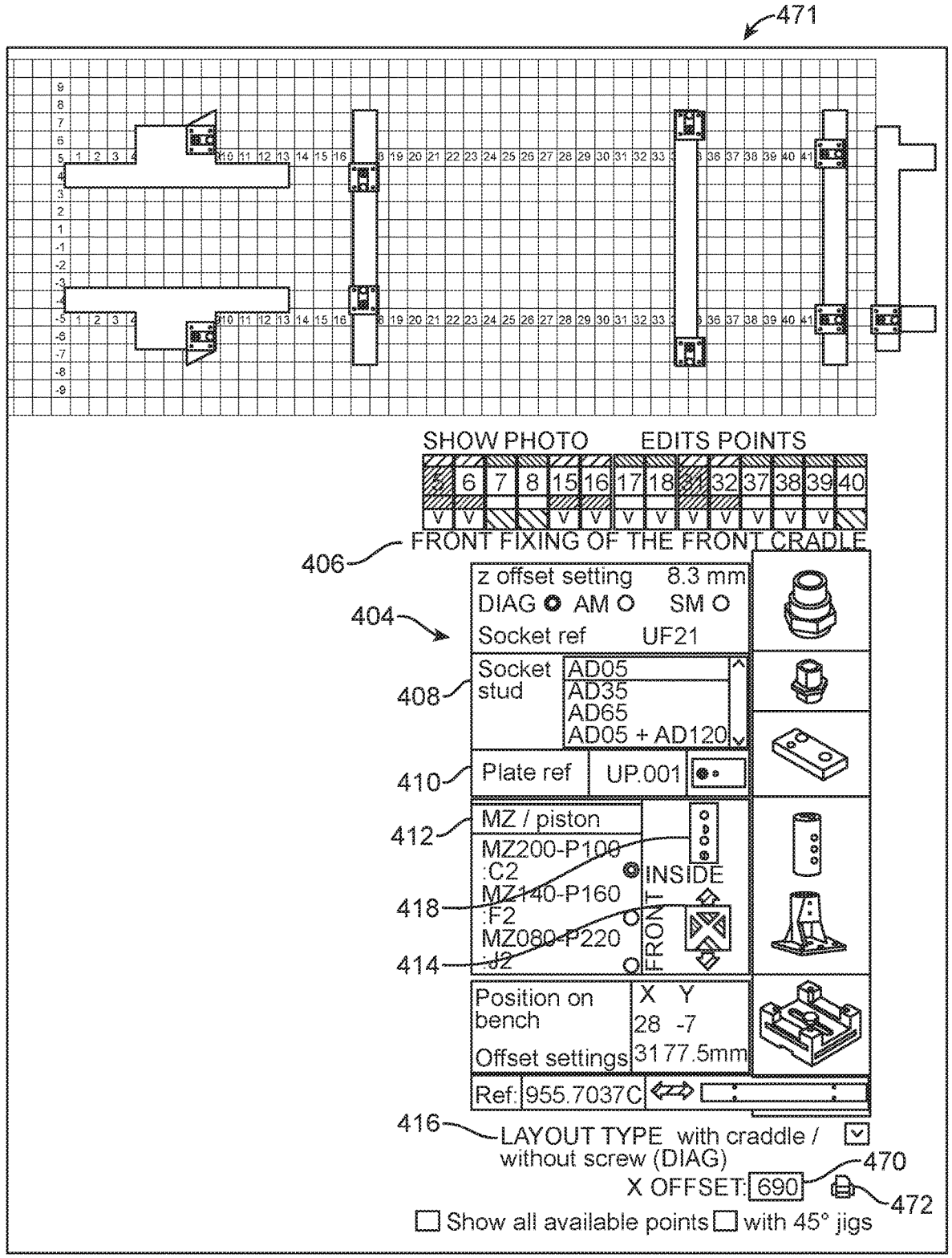
FIG. 26 exemplarily illustrates a screenshot controlling the position of the vehicle body using offset tab, according to an exemplary embodiment of the present invention.
Figure 27:
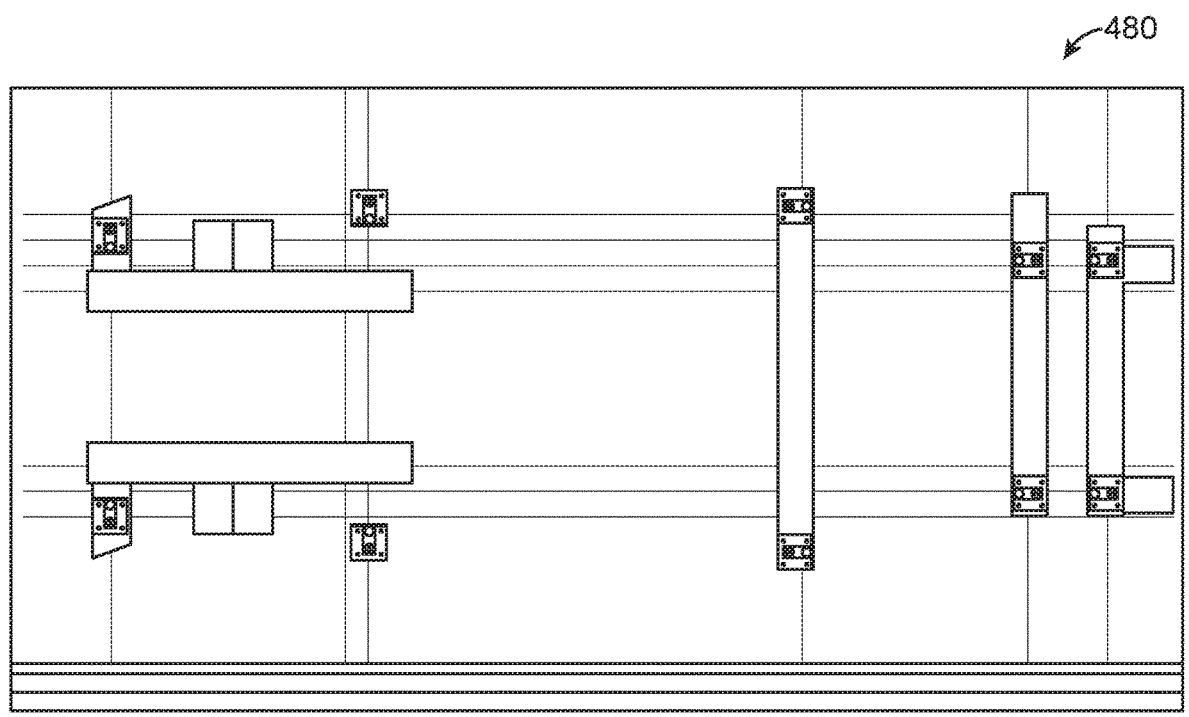
FIG. 27 exemplarily illustrates a screenshot of a generated layout of customized vehicle repair assembly, according to an exemplary embodiment of the present invention.

FIG. 26 exemplarily illustrates a screenshot 471 controlling the position of the vehicle body using offset tab 470 according to an embodiment of the present invention. Further, illustrates a print icon 472 is printing the generated customized vehicle repair configuration or assembly. FIG. 27 exemplarily illustrates a screenshot 480 of a generated layout of customized vehicle repair assembly on selecting the print icon in an embodiment of the present invention.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

The devices, systems, and methods have been described above, with reference to specific embodiments. Various changes may be made and equivalents may be substituted for elements thereof without departing from the scope of the disclosure. In addition, many modifications may be made to adapt a particular situation or material to the teachings found herein without departing from the essential scope thereof.

The disclosure, in various embodiments, configurations and aspects, includes components, methods, processes, systems and/or apparatuses as depicted and described herein, including various embodiments, sub-combinations, and subsets thereof. The various disclosed embodiments, configurations, and aspects include providing devices, systems, and processes in the absence of items not depicted and/or described herein or in various embodiments, configurations, or aspects hereof, including in the absence of such known items.

The foregoing discussion of the exemplary embodiments has been presented for purposes of illustration and description. The foregoing is not intended to limit the scope of the disclosure to the form or forms recited herein. In the foregoing Detailed Description for example, various features of the exemplary embodiments are grouped together in one or more embodiments, configurations, or aspects for the purpose of streamlining the disclosure. The features of the embodiments, configurations, or aspects of the exemplary embodiments may be combined in alternate embodiments, configurations, or aspects other than those discussed above. This method of disclosure is not to be interpreted as reflecting an intention that the exemplary embodiments require more features than may be recited in each claim. Thus, the following claims are hereby incorporated into this Detailed Description, with each claim standing on its own as a separate illustrative embodiment.

Moreover, the description of the exemplary embodiments has included descriptions of one or more embodiments, configurations, or aspects, and certain variations and modifications, other variations, combinations, and modifications that are within the scope of the disclosure including alternate, interchangeable and/or equivalent structures, functions, ranges or steps to those claimed, whether or not such alternate, interchangeable and/or equivalent structures, functions, ranges or steps are disclosed herein.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. Variations in such ranges are possible consistent with this disclosure, including the claims, which does not limit potential variations to disclosed ranges.

Advances in science and technology may make equivalents and substitutions possible that are not now contemplated by reason of the imprecision of language; these variations should be covered by the appended claims. This written description uses examples to disclose the method, machine and computer-readable medium. Other examples consistent with this disclosure may exist and are encompassed by the disclosure.

What is claimed is:

1. A system for designing a customized vehicle repair configuration, comprising:
 a server comprising a processor and a non-transitory memory unit;
 a database for storing data of a plurality of user and makes and models of vehicles, and control points of vehicles, and
 a user interface unit associated with a user to access the server via a wireless network,
  wherein the memory unit stores a set of data, and
  wherein the processor is configured to communicate with the memory unit and the database and comprises a set of execution units for executing the set of data stored in the non-transitory memory unit, wherein the set of execution units comprises:

a registration execution unit configured to allow a user to register by providing relevant information to identify the user and the vehicle, a model selector execution unit configured to enable the user to select a make and model of the vehicle, a diagnosis execution unit configured to display a screen comprising a vehicle repair assembly to allow the user to diagnose damage on the selected vehicle, wherein the vehicle repair configuration comprises a plurality of components including, a support frame for designing vehicle repair configuration, wherein the support frame comprises a pair of parallel longitudinal members and at least one elongated cross member secured to an upper surface of one of the parallel longitudinal members;

a jig assembly, including
an adjustable platform slidably mounted to the elongated cross member,
a tower member mounted to the adjustable platform,
a piston mounted perpendicularly to the adjustable platform and rotatably received within a through hole of the tower member,
a plate having a first end connected about a distal end of the piston and a second end opposite the first end, and
a height adaptor pivotably mounted to the second end and operatively connected to a socket, a customization execution unit configured to enable the user to customize each component of the jig assembly respective of the selected vehicle to generate a design of a customized vehicle repair assembly, wherein the customization execution unit customizes the jig assembly respective of a repair structure of the selected vehicle to generate the customized vehicle repair assembly, a collaboration execution unit configured to provide edit access to a number of users to tune the designed vehicle repair configuration, and a layout execution unit configured to generate a layout of the designed vehicle repair configuration.

2. The system of claim 1, wherein the adjustable platform further comprises:
a mounting plate mounted to the elongated cross member, and
a slide assembly slidably mounted to the mounting plate and having a longitudinal slide and a transverse slide, wherein the jig assembly is movable along the longitudinal slide and the transverse slide in the longitudinal and transverse directions, respectively.

3. The system of claim 1, wherein the jig assembly further comprises a screw adaptor for adjustably securing a screw to the plate.

4. The system of claim 1, wherein the customization execution unit customizes each component by adjusting a position of the jig assembly, moving crossmembers, turning tower member, changing piston configuration and increasing a jig head clearance.

5. The system of claim 1, wherein the diagnosis execution unit displays the screen comprising 3D vehicle repair assembly.

6. The system according to claim 1, wherein the user interface unit is at least one of a tablet computer, a personal computer, a personnel digital assistant, a smart phone, a smart television, a palm top, a phablet and a laptop.

7. The system according to claim 1, wherein the memory unit is at least one of non-volatile memory, read only memory (ROM), random access memory (RAM), and a flash memory.

8. A method for designing a customized vehicle repair configuration, comprising:
generating at a processor of a server, via a registration execution unit, a user account by a user device, wherein the account includes user information corresponding to an identification of the user account;
enabling at the processor of the server, via a model selector execution unit the user to select a make, and model of the vehicle and to visualize control points of the vehicle;
displaying at the processor of the server, via a diagnosis execution unit, a screen comprising a vehicle repair configuration to allow the user to diagnose damage on the selected vehicle, wherein the vehicle repair configuration comprises a plurality of components including:
a support frame for designing a vehicle repair configuration, wherein the support frame comprises a pair of parallel longitudinal members and at least one elongated cross member secured to an upper surface of one of the parallel longitudinal members;
a jig assembly, including
an adjustable platform slidably mounted to the elongated cross member,
a tower member mounted to the adjustable platform,
a piston mounted perpendicularly to the adjustable platform and rotatably received within a through hole of the tower member,
a plate having a first end connected about a distal end of the piston and a second end opposite the first end, and
a height adaptor pivotably mounted to the second end and operatively connected to a socket;
enabling at the processor of the server, via a customization execution unit, the user to customize each component of the jig assembly respective of the selected vehicle to generate a design of a customized vehicle repair assembly, wherein the customization execution unit customizes the jig assembly respective of a repair structure of the selected vehicle to generate the customized vehicle repair assembly;
providing at the processor of the server, via a collaboration execution unit, access to a number of users to edit the designed vehicle repair configuration, and
generating at the processor of the server, via a layout execution unit, a layout of the designed vehicle repair configuration.

9. The method of claim 8, wherein the adjustable platform further comprises:
a mounting plate mounted to the elongated cross member, and
a slide assembly slidably mounted to the mounting plate and having a longitudinal slide and a transverse slide, wherein the jig assembly is movable along the longitudinal slide and transverse slide in the longitudinal and the transverse directions, respectively.

10. The method of claim 8, wherein the jig assembly further comprises a screw adaptor for adjustably securing a screw to the plate.

11. The method of claim 8, wherein the customization execution unit customizes each component by adjusting a position of the jig assembly, moving crossmembers, turning tower member, changing piston configuration and increasing a jig head clearance.

12. The method of claim 8, wherein the diagnosis execution unit displays the screen comprising 3D vehicle repair assembly.

13. A non-transitory program storage device readable by computer, and comprising a program of instructions executable by a processor for designing a customized vehicle repair configuration using a vehicle repair system, wherein the processor comprises a number of execution units that communicates with non-transitory program storage device and executes the program of instructions to design a customized vehicle repair configuration using the vehicle repair system, the method for designing the customized vehicle repair configuration comprising the steps of:

generating at a processor of a server, via a registration execution unit, a user account by a user device, wherein the account includes user information corresponding to an identification of the user account;

enabling at the processor of the server, via a model selector execution unit the user to select a make and model of the vehicle;

displaying at the processor of the server, via a diagnosis execution unit, a screen comprising a vehicle repair configuration to allow the user to diagnose damage on the selected vehicle, wherein the vehicle repair configuration comprises a plurality of components including:

a support frame for designing vehicle repair configuration, wherein the support frame comprises a pair of parallel longitudinal members and at least one elongated cross member secured to an upper surface of one of the parallel longitudinal members;

a jig assembly, including
an adjustable platform slidably mounted to the elongated cross member, a tower member mounted to the adjustable platform,
a piston mounted perpendicularly to the adjustable platform and rotatably received within a through hole of the tower member,
a plate having a first end connected about a distal end of the piston and a second end opposite the first end, and
a height adaptor pivotably mounted to the second end and operatively connected to a socket;

enabling, at the processor of the server, via a customization execution unit, the user to customize each component of the jig assembly respective of the selected vehicle to generate a design of a customized vehicle repair assembly, wherein the customization execution unit customizes the jig assembly respective of a repair structure of the selected vehicle to generate the customized vehicle repair assembly, providing at the processor of the server, via a collaboration execution unit, access to a number of users to edit the designed vehicle repair configuration, and generating at the processor of the server, via a layout execution unit, a layout of the designed vehicle repair configuration.

14. The method of claim 13, wherein the adjustable platform further comprises:

a mounting plate mounted to the elongated cross member, and a slide assembly slidably mounted to the mounting plate and having a longitudinal slide and a transverse slide, wherein the jig assembly is movable along the longitudinal slide and the transverse slide in the longitudinal and transverse directions, respectively.

15. The method of claim 13, wherein the jig assembly further comprises a screw adaptor for adjustably securing a screw to the plate.

* * * * *